(12) United States Patent
Koyess et al.

(10) Patent No.: US 10,897,952 B2
(45) Date of Patent: *Jan. 26, 2021

(54) SKATE AND METHOD OF MANUFACTURE

(71) Applicant: Sport Maska Inc., Montreal (CA)

(72) Inventors: Philippe Koyess, Orford (CA);
Alexandre Chretien, Laval (CA);
Daniel Chartrand, Lorraine (CA);
Etienne Champagne,
Saint-Joseph-de-Beauce (CA); Philippe Lapierre, Montreal (CA)

(73) Assignee: SPORT MASKA INC., Montreal (CA)

( * ) Notice: Subject to any disclaimer, the term of this patent is extended or adjusted under 35 U.S.C. 154(b) by 16 days.

This patent is subject to a terminal disclaimer.

(21) Appl. No.: 15/479,676

(22) Filed: Apr. 5, 2017

(65) Prior Publication Data

US 2017/0202298 A1 Jul. 20, 2017

Related U.S. Application Data

(63) Continuation of application No. 14/687,000, filed on Apr. 15, 2015, now Pat. No. 9,648,922.

(51) Int. Cl.
*A43B 5/16* (2006.01)
*A43B 23/02* (2006.01)

(52) U.S. Cl.
CPC .......... *A43B 5/1666* (2013.01); *A43B 5/1625* (2013.01); *A43B 5/1641* (2013.01);
(Continued)

(58) Field of Classification Search
CPC ... A43B 5/1666; A43B 5/1625; A43B 5/1616; A43B 5/16; A43B 5/0407; A43B 5/0409;
(Continued)

(56) References Cited

U.S. PATENT DOCUMENTS

| 3,848,286 A | 11/1974 | Kahmann |
| 3,848,287 A | 11/1974 | Simonsen |

(Continued)

FOREIGN PATENT DOCUMENTS

| CA | 2194646 | 7/1997 |
| CA | 2238844 | 11/1998 |

(Continued)

OTHER PUBLICATIONS

European Search Report dated Oct. 7, 2019 for application No. 19164946.6.

*Primary Examiner* — Heather Mangine
(74) *Attorney, Agent, or Firm* — Norton Rose Fulbright Canada

(57) ABSTRACT

A skate boot shell including a tridimensional outer sub-shell made of a first material, the outer sub-shell including a first sole portion connected to first heel, ankle and side portions; a tridimensional inner sub-shell received within and connected to the outer sub-shell, an outer surface of the inner sub-shell being complementary to an inner surface of the outer sub-shell, the inner sub-shell being made of a second material different from the first material; and a tridimensional reinforcement sub-shell made of a third material different from the first and second materials and bonded inside at least one of the inner and outer sub-shells.

19 Claims, 19 Drawing Sheets

(52) U.S. Cl.
CPC .......... *A43B 5/1683* (2013.01); *A43B 5/1691* (2013.01); *A43B 23/026* (2013.01); *A43B 23/0255* (2013.01)

(58) Field of Classification Search
CPC ... A43B 5/0405; A43B 5/0482; A43B 5/1683; A43B 23/0235; A43B 5/164; A43B 5/049; A43B 5/1691; B29D 35/146; B29D 35/148; B29D 35/12; B29D 35/0054; B29D 35/04; B29D 35/126; B29D 35/0072; B29D 35/0063; B29C 59/02
USPC .... 12/128 R, 129.4, 146 C, 146 B; 264/293; 36/115
See application file for complete search history.

(56) References Cited

U.S. PATENT DOCUMENTS

| | | |
|---|---|---|
| 3,866,927 A | 2/1975 | Tvengsberg |
| 3,896,202 A | 7/1975 | Palau |
| 3,939,583 A | 2/1976 | Daumann |
| 3,975,840 A | 8/1976 | Juzenko |
| 4,120,064 A | 10/1978 | Salomon |
| 4,126,323 A | 11/1978 | Scherz |
| 4,255,202 A | 3/1981 | Swan, Jr. |
| 4,351,537 A | 9/1982 | Seidel |
| 4,384,413 A | 5/1983 | Bourque |
| 4,385,456 A | 5/1983 | Livernois et al. |
| 4,414,762 A | 11/1983 | Salomon et al. |
| 4,509,276 A | 4/1985 | Bourque |
| 4,651,444 A | 3/1987 | Ours |
| 4,654,986 A | 4/1987 | George |
| 4,724,627 A | 2/1988 | Sisco |
| 4,777,741 A | 10/1988 | James |
| 4,964,229 A | 10/1990 | Laberge |
| 5,171,033 A | 12/1992 | Olson et al. |
| 5,255,929 A | 10/1993 | Lemelson |
| 5,326,115 A | 7/1994 | Seltzer |
| 5,331,752 A | 7/1994 | Johnson et al. |
| 5,339,544 A | 8/1994 | Caberlotto |
| 5,342,070 A | 8/1994 | Miller et al. |
| 5,411,278 A | 5/1995 | Wittmann |
| 5,462,295 A | 10/1995 | Seltzer |
| 5,582,417 A | 12/1996 | Schaper et al. |
| 5,727,271 A | 3/1998 | Romanato et al. |
| 5,794,362 A | 8/1998 | Polk, III et al. |
| 5,799,955 A | 9/1998 | Iverson |
| 5,871,683 A | 2/1999 | Schaper et al. |
| 5,878,513 A | 3/1999 | Annovi et al. |
| 5,885,500 A | 3/1999 | Tawney et al. |
| 5,885,622 A | 3/1999 | Daley |
| 5,913,593 A | 6/1999 | Aird et al. |
| 6,079,128 A | 6/2000 | Hoshizaki et al. |
| 6,102,412 A | 8/2000 | Staffaroni |
| 6,112,434 A | 9/2000 | Seltzer et al. |
| 6,260,290 B1 | 7/2001 | Chenevert |
| 6,295,679 B1 | 10/2001 | Chenevert |
| 6,403,692 B1 | 7/2002 | Traugott et al. |
| 6,499,233 B1 | 12/2002 | Chenevert |
| 6,499,748 B2 | 12/2002 | Meibock et al. |
| 6,505,422 B2 | 1/2003 | Racine |
| 6,558,784 B1 | 5/2003 | Norton et al. |
| 6,670,029 B2 | 12/2003 | Norton et al. |
| 6,746,027 B1 | 6/2004 | Soo |
| 6,748,676 B1 | 6/2004 | Chenevert |
| 6,769,203 B1 | 8/2004 | Wright et al. |
| 6,871,424 B2 | 3/2005 | Labonte et al. |
| 6,922,919 B2 | 8/2005 | Chenevert |
| 6,994,532 B2 | 2/2006 | Vachon et al. |
| 7,039,977 B2 | 5/2006 | Wilder |
| 7,140,127 B2 | 11/2006 | Yang |
| 7,219,900 B2 | 5/2007 | Meibock |
| 7,316,083 B2 | 1/2008 | Labonte |
| 7,373,742 B2 | 5/2008 | Murphy |
| 7,398,609 B2 | 7/2008 | Labonte |
| 7,451,991 B2 | 11/2008 | Labonte |
| 7,520,070 B2 | 4/2009 | Cagliari et al. |
| 7,533,479 B2 | 5/2009 | Labonte |
| 7,618,464 B2 | 11/2009 | Christensen |
| 7,716,854 B2 | 5/2010 | Roux et al. |
| 8,387,286 B2 | 3/2013 | Koyess et al. |
| 8,813,393 B2 | 8/2014 | Koyess et al. |
| 2004/0016150 A1 | 1/2004 | Labonte et al. |
| 2004/0049950 A1 | 3/2004 | Van Horne |
| 2004/0058102 A1 | 3/2004 | Baychar |
| 2004/0207164 A1 | 10/2004 | Meibock et al. |
| 2004/0226113 A1 | 11/2004 | Wright et al. |
| 2005/0116379 A1 | 6/2005 | Goldsmith et al. |
| 2005/0126046 A1 | 6/2005 | Labonte et al. |
| 2005/0134010 A1 | 6/2005 | Blankenburg et al. |
| 2005/0236784 A1 | 10/2005 | Lampieri |
| 2006/0005424 A1 | 1/2006 | Laska et al. |
| 2006/0162192 A1 | 7/2006 | Roux et al. |
| 2006/0181035 A1 | 8/2006 | Labonte |
| 2006/0181076 A1* | 8/2006 | Labonte ............... A43B 5/1683 280/841 |
| 2007/0186448 A1 | 8/2007 | Meibock |
| 2010/0156058 A1 | 6/2010 | Koyess et al. |
| 2014/0059886 A1 | 3/2014 | Lyttle et al. |
| 2014/0134378 A1 | 5/2014 | Downs et al. |
| 2014/0259794 A1 | 9/2014 | Labonte |
| 2014/0327216 A1 | 11/2014 | Koyess et al. |

FOREIGN PATENT DOCUMENTS

| | | |
|---|---|---|
| CA | 2256919 | 6/2000 |
| CA | 2256932 | 6/2000 |
| CA | 2515254 | 6/2000 |
| CA | 2328569 | 10/2001 |
| CA | 2309565 | 11/2001 |
| CA | 2322343 | 4/2002 |
| CA | 2424081 | 4/2002 |
| DE | 3043425 | 7/1982 |
| EP | 0777981 | 6/1997 |
| EP | 0781516 | 7/1997 |
| EP | 0841016 | 5/1998 |
| EP | 0937487 | 8/1999 |
| EP | 0956788 | 11/1999 |
| EP | 1013315 | 6/2000 |
| EP | 1016353 | 7/2000 |
| EP | 1384568 | 1/2004 |
| EP | 1582107 | 10/2005 |
| EP | 1685771 | 4/2008 |
| EP | 1946662 | 7/2008 |
| JP | 2000023714 | 1/2000 |
| WO | 9407386 | 4/1994 |
| WO | 9503101 | 2/1995 |
| WO | 2004069351 | 8/2004 |

* cited by examiner

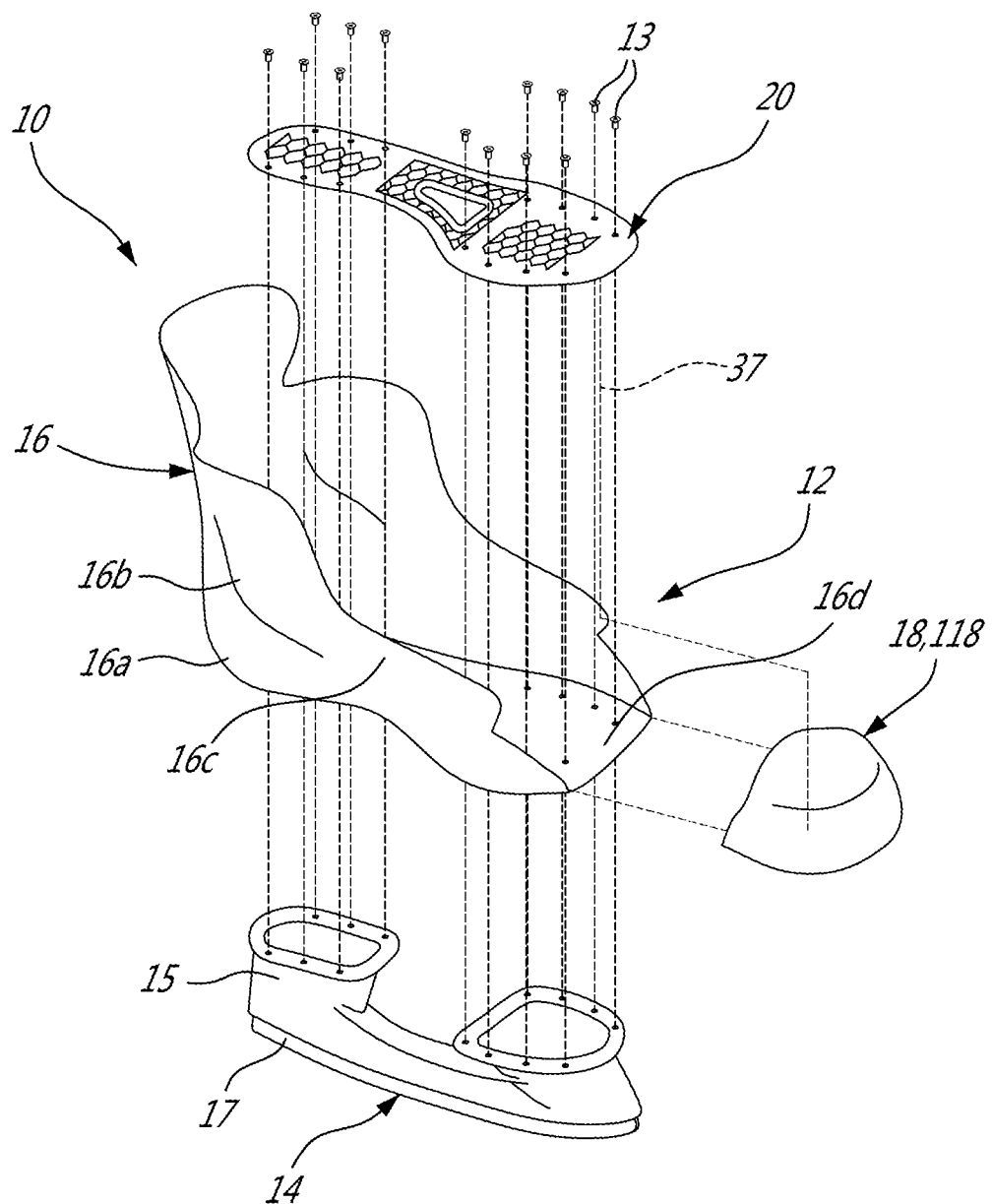

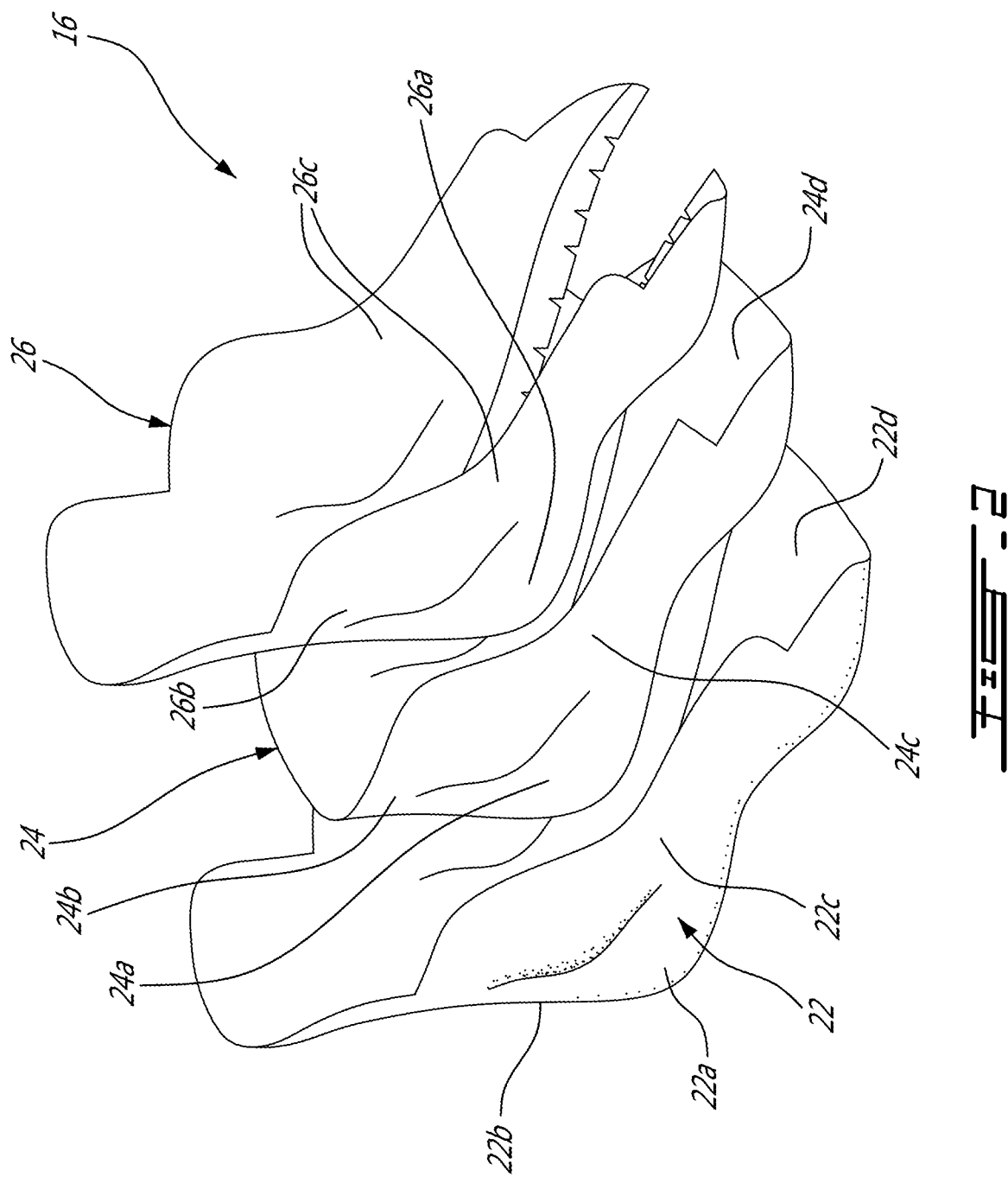

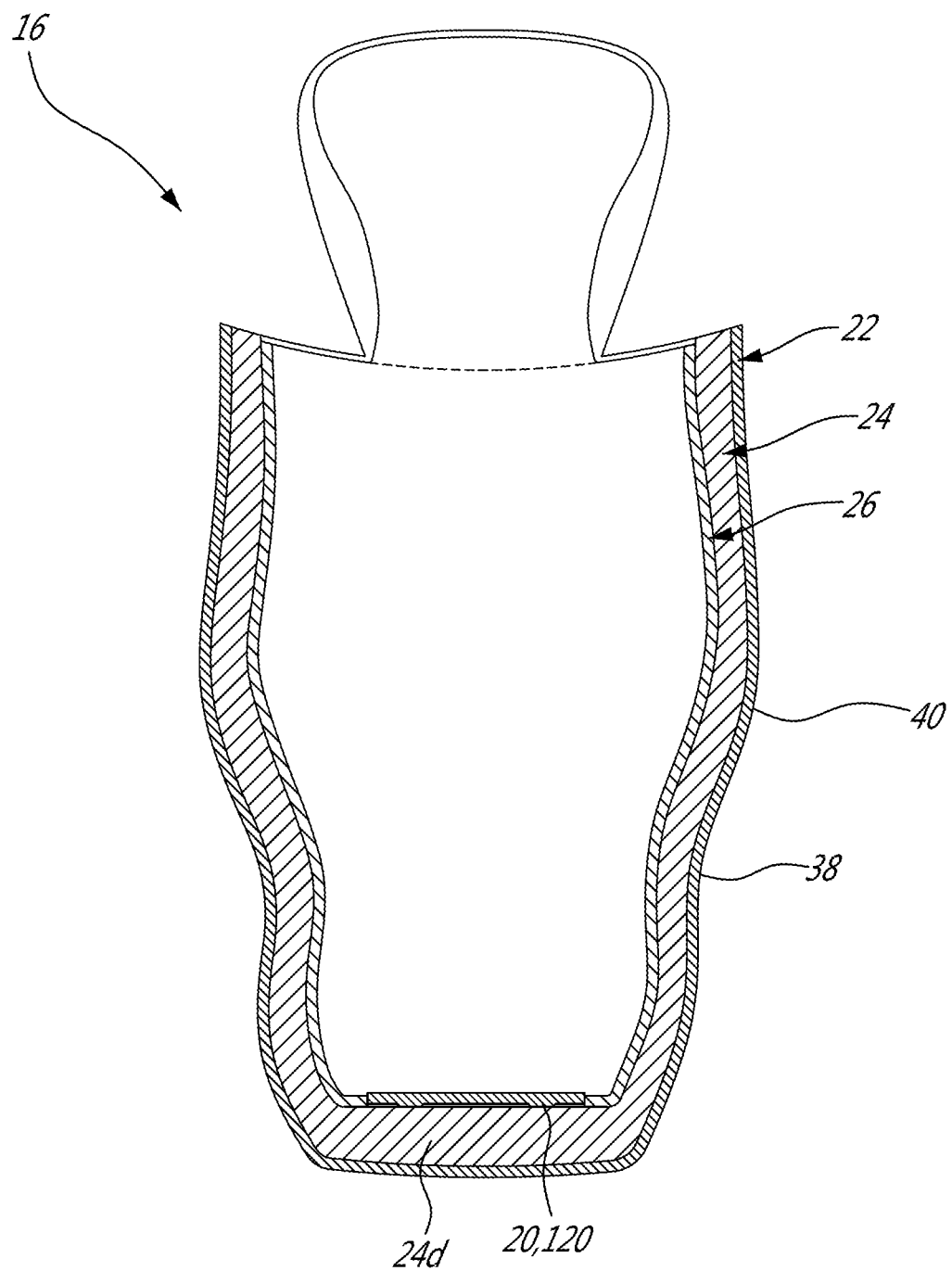

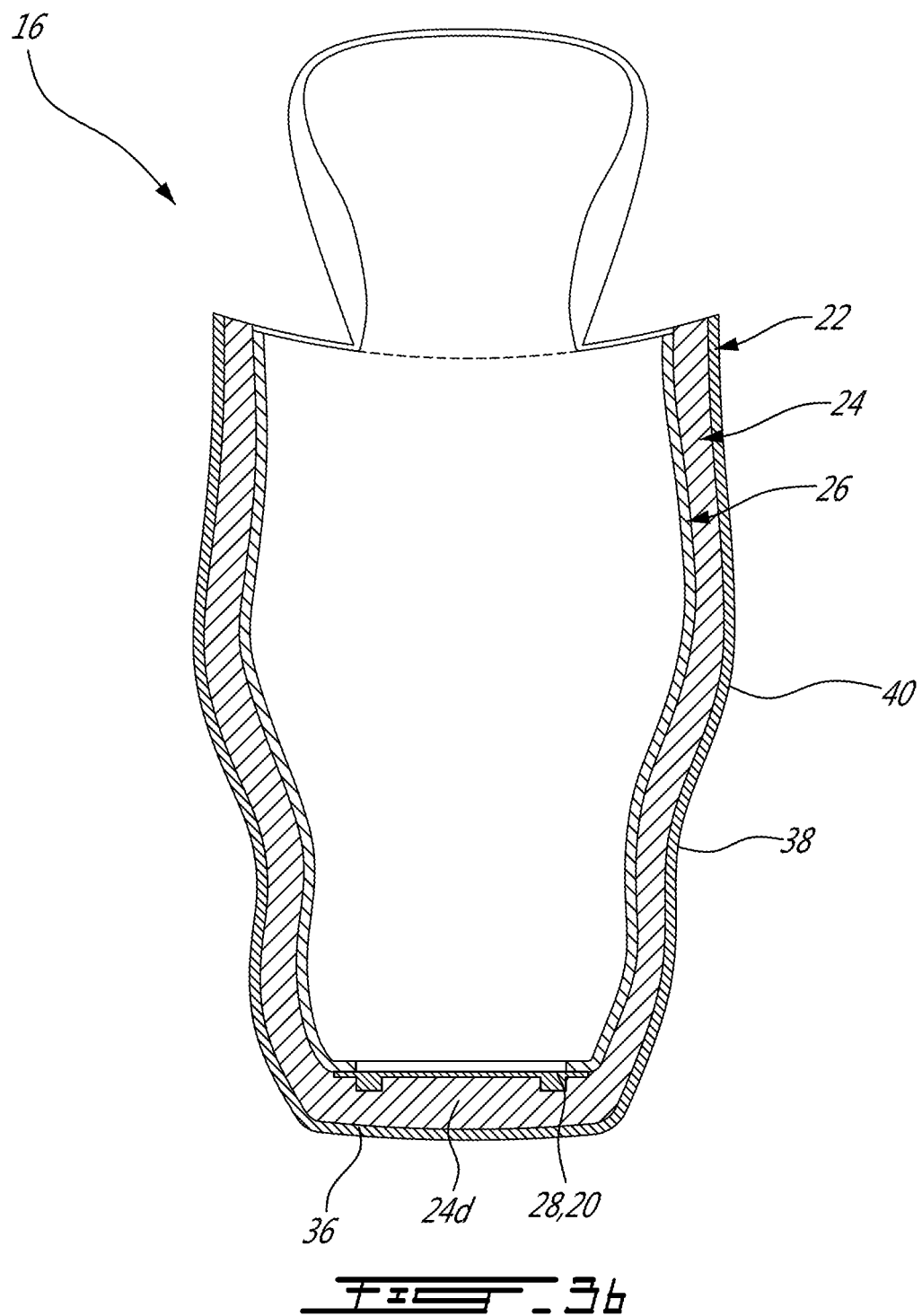

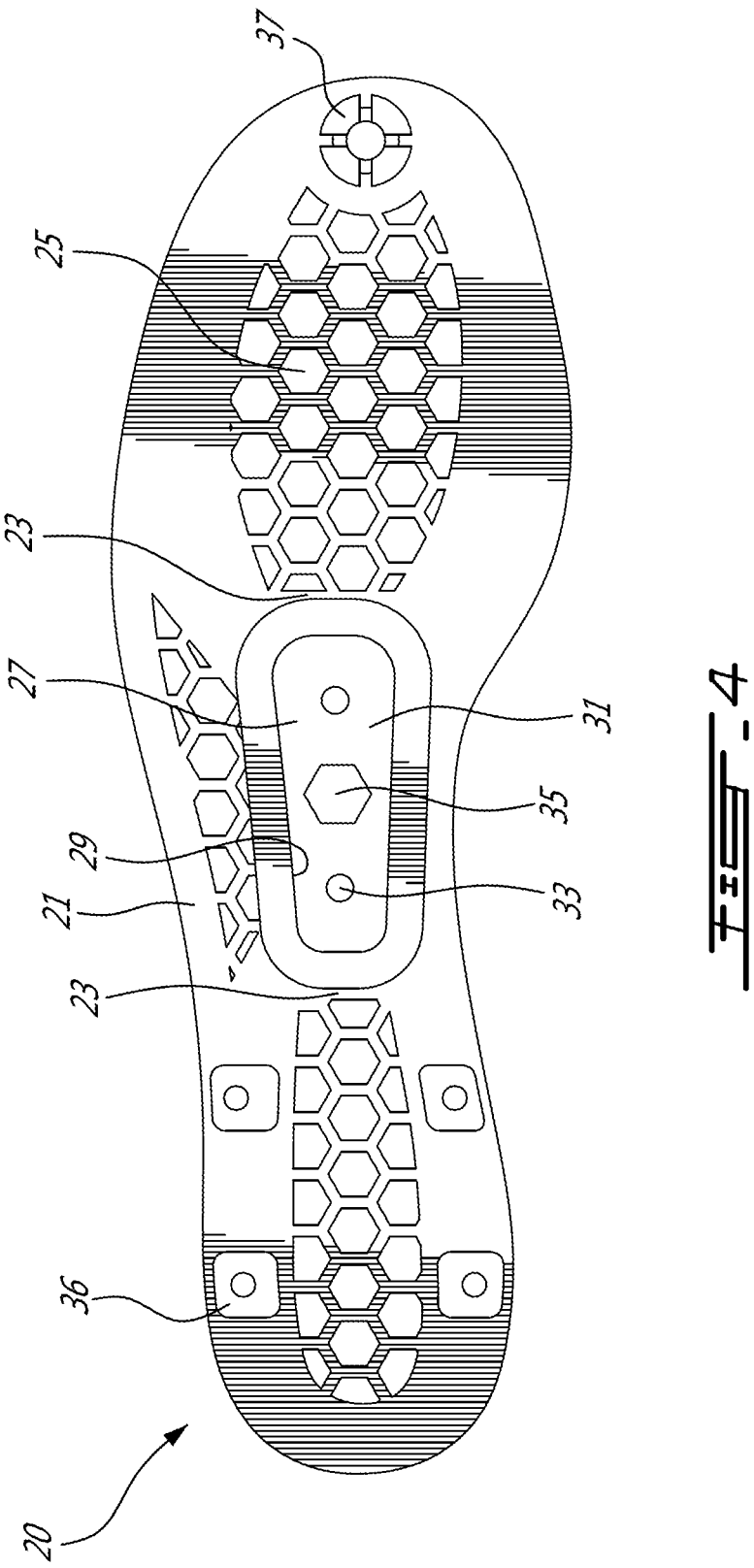

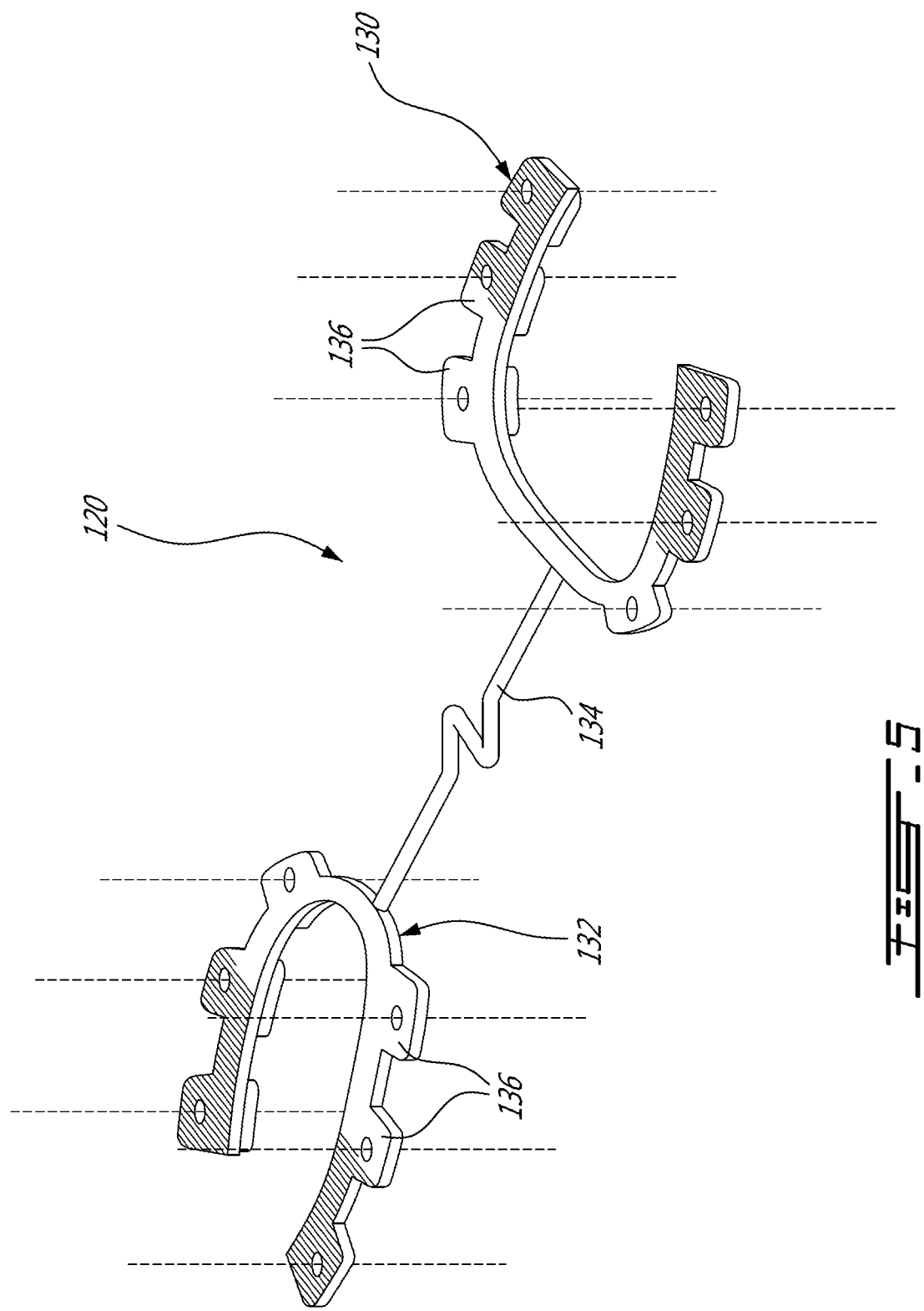

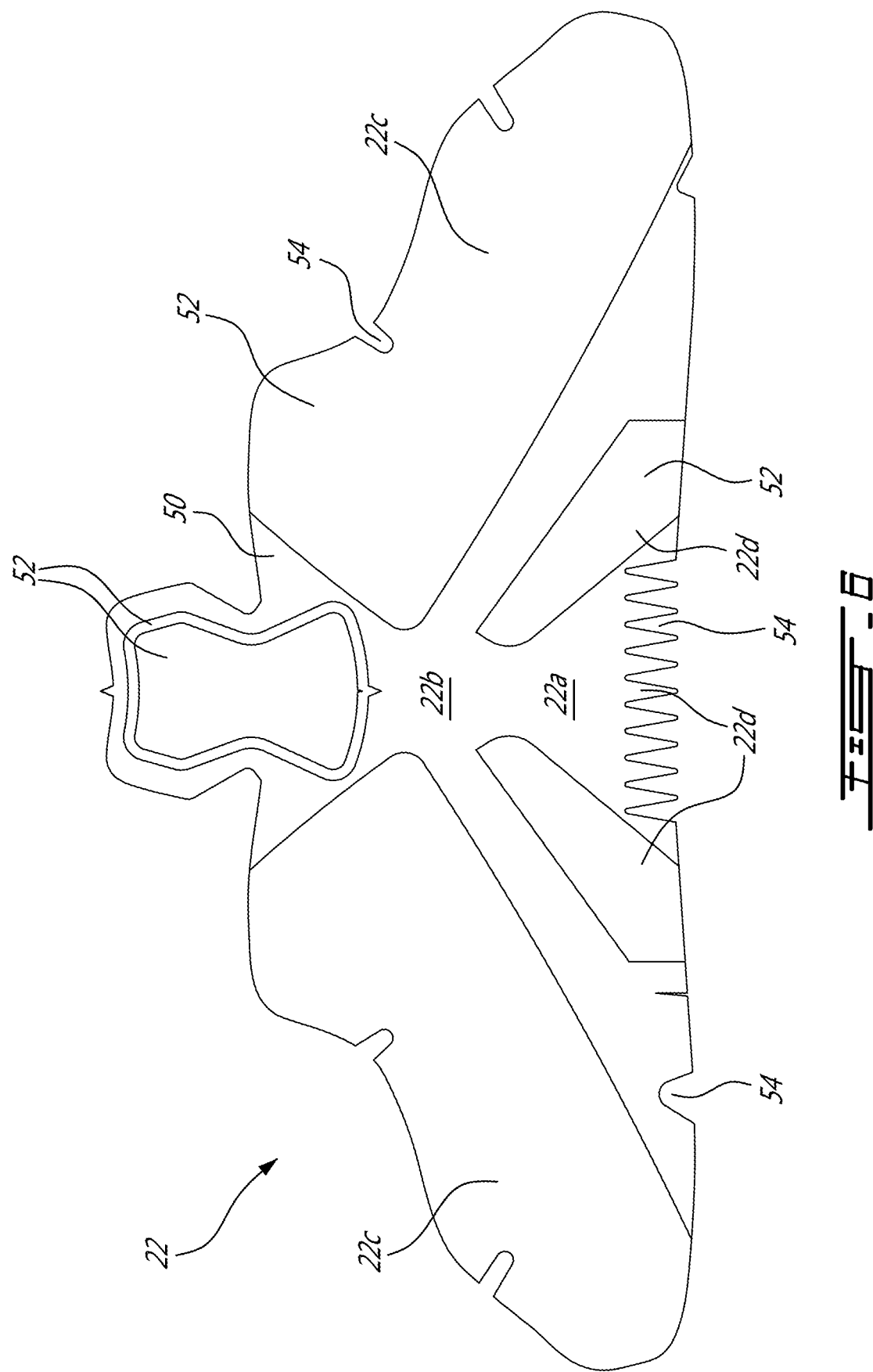

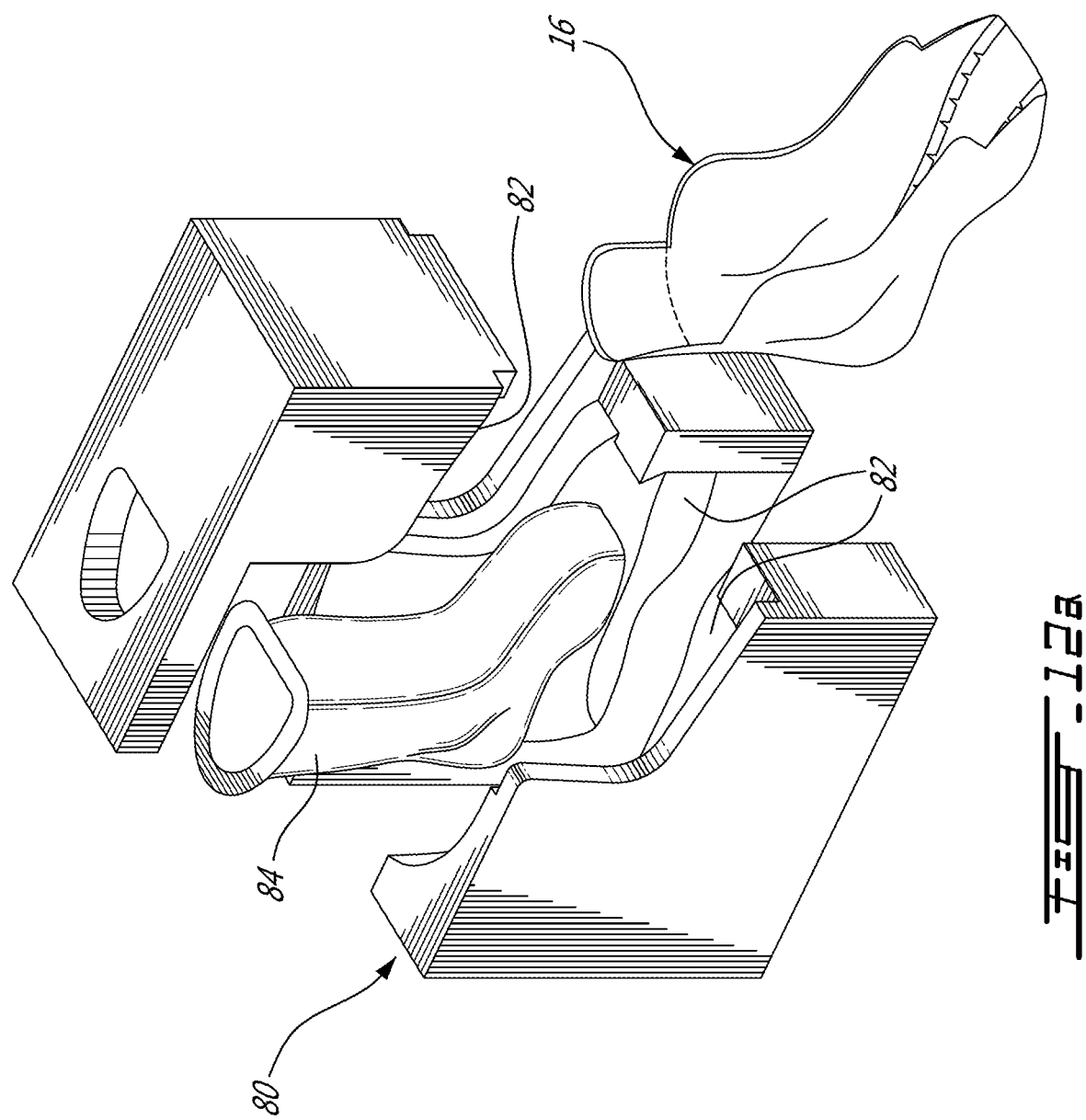

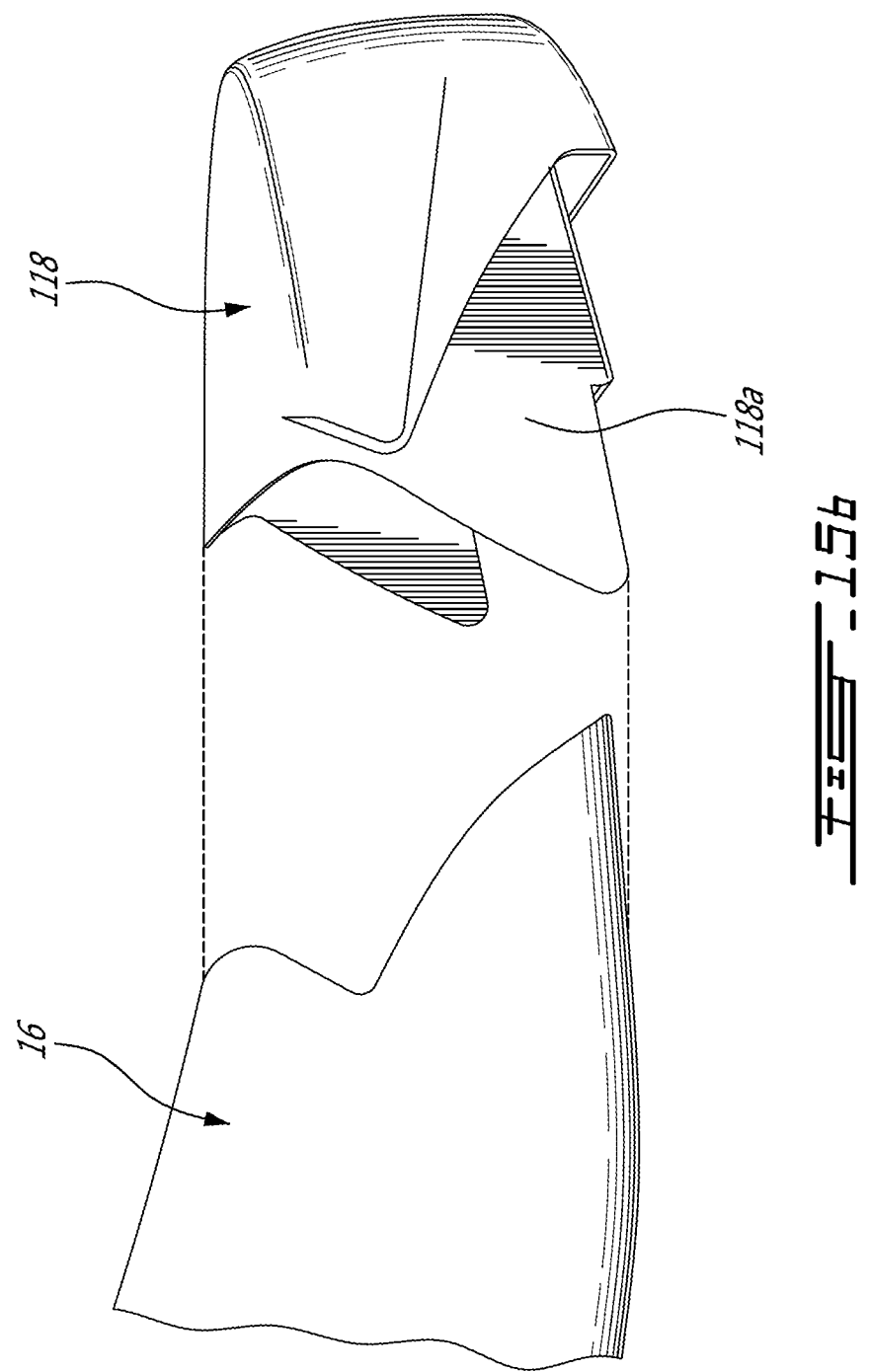

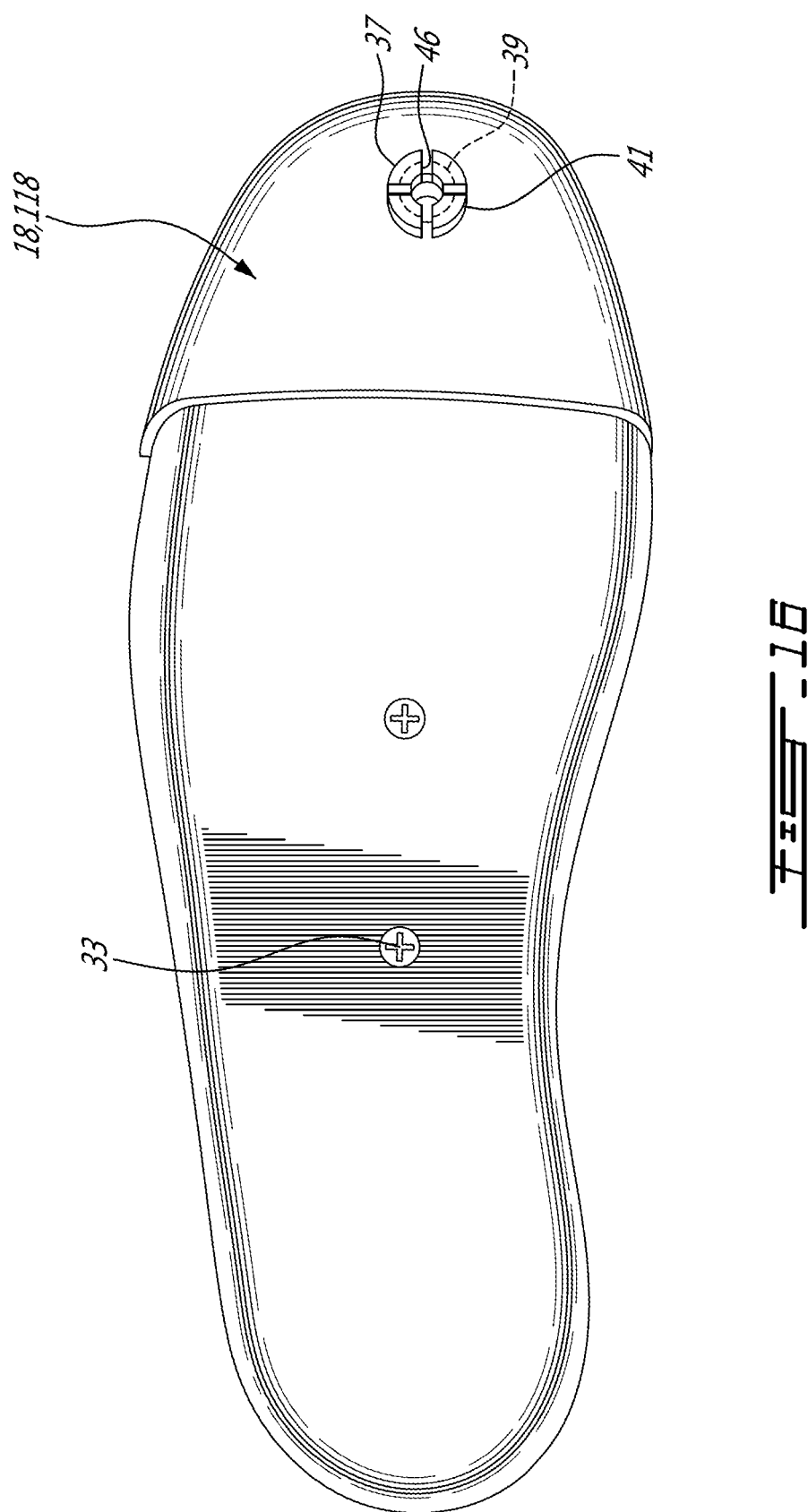

SKATE AND METHOD OF MANUFACTURE

CROSS-REFERENCE TO RELATED APPLICATIONS

This application is a continuation of U.S. application Ser. No. 14/687,000 filed Apr. 15, 2015, which claims priority from provisional application No. 61/979,725 filed Apr. 15, 2014, the entire contents of both of which are incorporated by reference herein.

TECHNICAL FIELD

The application relates generally to skates and, more particularly, to boots for such skates.

BACKGROUND OF THE ART

A skate typically has a skate boot and a ground-engaging skate element such as a blade or a set of inline rollers attached to the underside of the boot. Typical "lasted" skate boots are made in a manner similar to traditional shoe making techniques. Small pieces having various shapes and form, typically made from different materials, are usually superimposed on a last one by one, where they are worked to form the appropriate foot shape and secured via stitching, gluing, tacking, etc. Lasted skate boots are usually not identical to one another since they are each individually made by hand.

It is also known to make a flat "sandwich" of the laminated layers of material of which the boot is to be made, with the sandwich of interconnected layers being put on the last and bent into shape. However the bending may induce stresses, particularly at the interface between the layers.

It is also known to mold skate boots from relatively rigid plastic or composite material, as a monolithic shell or with sub-shells. Monolithic shell boots may tend to be overly rigid. For boot having sub-shells, the connexion between sub-shells may be inadequate and/or induce stresses on the skate boot.

SUMMARY

In one aspect, there is provided a method of manufacturing a skate boot shell, the method comprising: shaping a tridimensional outer sub-shell to define a first heel portion, a first ankle portion connected to the first heel portion, and two opposed first side portions extending from the first heel and ankle portions; shaping a tridimensional inner sub-shell to define a second heel portion, a second ankle portion connected to the second heel portion, and two opposed second side portions extending from the second heel and ankle portions, the inner sub-shell having an outer surface complementary to an inner surface of the outer sub-shell; and bonding the shaped sub-shells together through lamination, the lamination being performed after the outer and inner sub-shells are shaped, the lamination being performed with the inner sub-shell in the outer sub-shell and with the outer surface of the inner sub-shell in alignment with the inner surface of the outer sub-shell, the lamination including applying one or both of heat on the sub-shells and pressure on one of the inner and outer sub-shells toward the other of the inner and outer sub-shells, the other of the inner and outer sub-shells resting against a mold surface.

In another aspect, there is provided a method of manufacturing a skate boot shell, the method comprising: shaping a tridimensional outer sub-shell from a first material, including: providing at least one layer of the first material in a flat configuration, the first material being in a formable state, forming the at least one layer to conform to a mold surface, the mold surface defining a first heel portion, a first ankle portion connected to the first heel portion, and two opposed first side portions extending from the first heel and ankle portions, pressing the at least one layer against the mold surface while heating the at least one layer, and cooling the outer sub-shell, the cooled outer sub-shell retaining its tridimensional shape defining the first heel, ankle and side portions; shaping a tridimensional inner sub-shell separately from the outer sub-shell, the inner sub-shell being shaped to have a second heel portion, a second ankle portion connected to the second heel portion, and two opposed second side portions extending from the second heel and ankle portions, the inner sub-shell having an outer surface complementary to an inner surface of the outer sub-shell; and bonding the shaped inner sub-shell inside the shaped outer sub-shell with the outer surface of the inner sub-shell in alignment with the inner surface of the outer sub-shell.

In another aspect, there is provided a skate comprising: a skate boot having a shell including: a tridimensional outer sub-shell made of a first material, the outer sub-shell including a first heel portion, a first ankle portion connected to the first heel portion, two opposed first side portions extending from the first heel and ankle portions, and a first sole portion connected to the first heel, ankle and side portions, a tridimensional inner sub-shell received within and connected to the outer sub-shell, an outer surface of the inner sub-shell being complementary to an inner surface of the outer sub-shell, the inner sub-shell being made of a second material different from the first material, the inner sub-shell including a second heel portion, a second ankle portion connected to the second heel portion, and two opposed second side portions extending from the second heel and ankle portions, and a tridimensional reinforcement sub-shell made of a third material different from the first and second materials and bonded inside at least one of the inner and outer sub-shells, the reinforcement sub-shell including a third heel portion, a third ankle portion connected to the third heel portion, and two opposed third side portions extending from the third heel and ankle portions; and a ground-engaging assembly received along a bottom surface of the first sole portion and engaged to the skate boot.

In another aspect, there is provided a skate comprising: a tridimensional skate boot shell including a heel portion, an ankle portion connected to the heel portion, two opposed side portions extending from the heel and ankle portions, and a sole portion connected to the heel, ankle and side portions; a sole insert embedded in or received in the skate boot shell such that at least part of a thickness of the sole portion is defined under the sole insert; and a holder under the skate boot shell configured for retaining a ground-engaging skate element, the holder connected to the sole insert by at least one fastener extending through the at least part of the thickness of the sole portion.

In a further aspect, there is provided a method of manufacturing a skate boot, the method comprising: providing a tridimensional skate boot shell having a heel portion, an ankle portion connected to the heel portion, and two opposed side portions extending from the heel and ankle portions, the skate boot shell having a sole insert embedded therein or received therein such that at least part of a thickness of the sole portion is defined under the sole insert; and attaching a holder configured for retaining at least one ground-engaging skate element under the skate boot shell by connecting the holder to the sole insert with at least one fastener extending through the at least part of the thickness of the sole portion.

In a further aspect, there is provided a skate boot shell comprising: a tridimensional outer sub-shell made of a first material, the outer sub-shell including a first heel portion, a first ankle portion connected to the first heel portion, two opposed first side portions extending from the first heel and ankle portions, and a first sole portion connected to the first heel, ankle and side portions; a tridimensional inner sub-shell received within and connected to the outer sub-shell, an outer surface of the inner sub-shell being complementary to at least part of an inner surface of the outer sub-shell, the inner sub-shell being made of a second material different from the first material; and a tridimensional reinforcement sub-shell made of a third material different from the first and second materials and bonded inside at least one of the inner and outer sub-shells.

DESCRIPTION OF THE DRAWINGS

Reference is now made to the accompanying figures in which:

FIG. 1 is a schematic tridimensional exploded view of a skate in accordance with a particular embodiment;

FIG. 2 is a schematic tridimensional exploded view of a boot shell of the skate of FIG. 1;

FIG. 3a is a schematic front cross-sectional view of the boot shell of FIG. 2, in accordance with a particular embodiment;

FIG. 3b is a schematic front cross-sectional view of the boot shell of FIG. 2, in accordance with another particular embodiment;

FIG. 4 is a schematic bottom view of a sole insert in accordance with a particular embodiment;

FIG. 5 is a schematic tridimensional view of a sole insert in accordance with another particular embodiment;

FIG. 6 is a schematic plan view of a flat material form to be shaped to define an outer sub-shell in accordance with a particular embodiment, which may be used in a skate boot shell such as shown in FIG. 2;

FIG. 12a is a schematic tridimensional exploded view illustrating the lamination of the components of a skate boot shell such as shown in FIG. 2, in accordance with a particular embodiment;

FIG. 13b is a schematic tridimensional view of a boot shell being reshaped in the press of FIG. 13a;

FIG. 15b is a schematic side view of a toe cap and a front portion of a skate boot shell, in accordance with another particular embodiment; and FIG. 16 is a schematic bottom view of a skate boot shell and toe cap such as shown in FIG. 15a.

DETAILED DESCRIPTION

Figure 7:
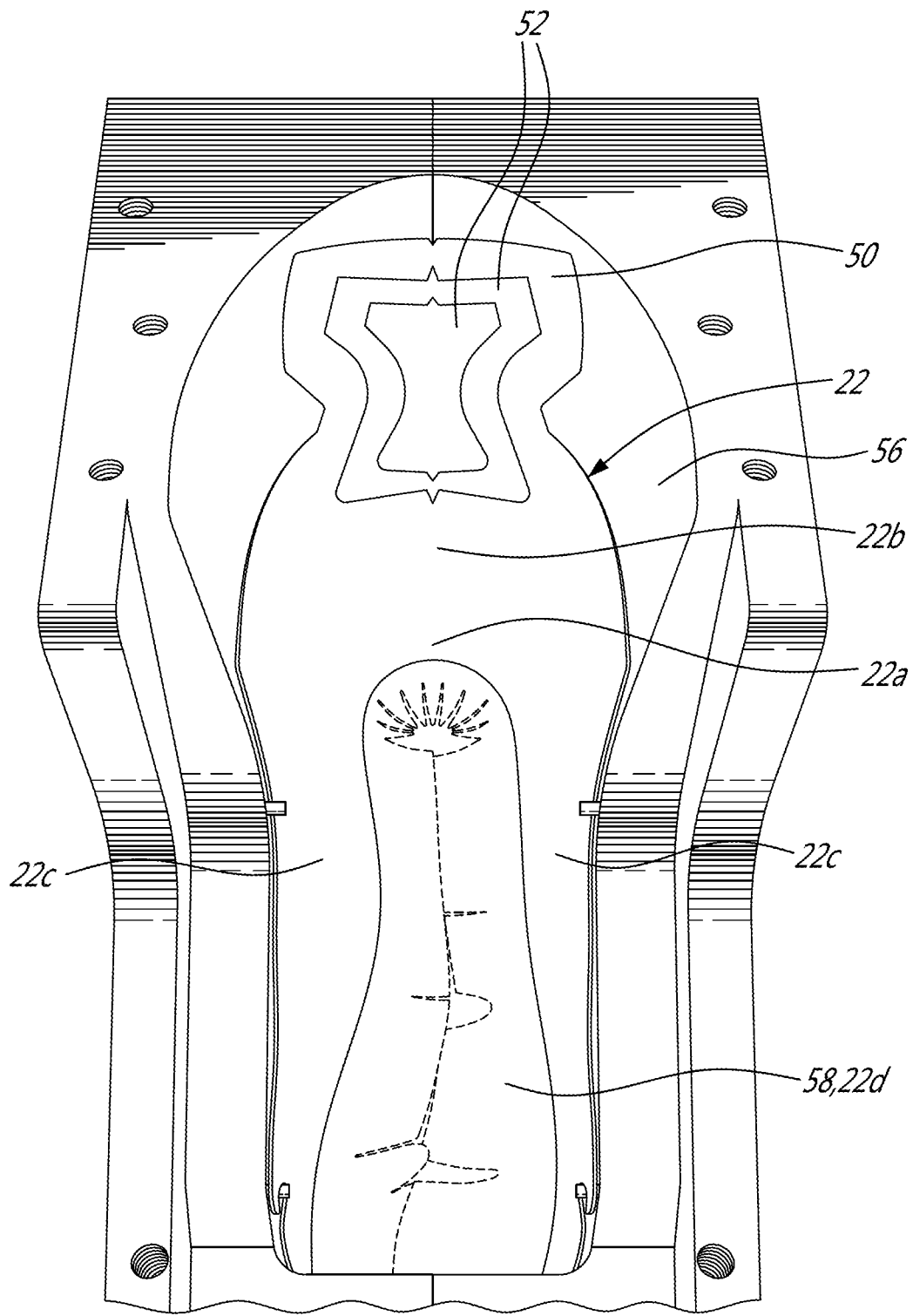
FIG. 7 is a schematic tridimensional view of an outer sub-shell being shaped in accordance with a particular embodiment.

Referring to FIG. 1, a skate 10 is generally shown. The skate 10 includes a skate boot 12 and a ground-engaging assembly 14 including a holder 15 and a ground-engaging element 17, which is shown as a blade. It is understood that the particular skate configuration shown here is provided as an example only and that alternate configurations are possible, including, but not limited to, other types of ground engaging assemblies such as roller skate ground engaging assemblies where the ground engaging elements include rollers or wheels. The skate boot 12 includes a boot shell 16 and a toe cap 18, 118, which in the embodiment shown is engaged to the boot shell 16. The boot shell generally includes a heel portion 16a, an ankle portion 16b connected to the heel portion 16a, two opposed side portions 16c extending from the heel and ankle portions 16a, 16b, and a sole portion 16d connected to the heel, ankle and side portions 16a, 16b, 16c.

Although not shown, the skate boot 12 typically includes other elements connected to the boot shell 16, such as for example a tongue on the front, an inner liner received inside the boot shell 16, a facing along the side edges including eyelets for receiving laces, etc.

Referring to FIGS. 2 and 3a-3b, the boot shell 16 generally includes interconnected sub-shells, which in the embodiment shown include a tridimensional outer sub-shell 22, a tridimensional inner sub-shell 24, and a tridimensional reinforcement sub-shell 26. The reinforcement sub-shell 26 is shown as being located inside of the inner sub-shell 24, but may alternately be located between the outer and inner sub-shells 22, 24. In another embodiment which is not shown, two reinforcement sub-shells are provided, one between the outer and inner sub-shells 22, 24 and one inside the inner sub-shell 24. In an alternate embodiment, the reinforcement sub-shell 26 is omitted.

The outer sub-shell 22 includes a heel portion 22a, an ankle portion 22b connected to the heel portion and shown here as including an optional tendon guard, two opposed side portions 22c extending from the heel and ankle portions 22a, 22b, and a sole portion 22d connected to the heel, ankle and side portions 22a, 22b, 22c. In a particular embodiment, the sole portion 22d is formed from a separate piece seamlessly connected or fused to the other portions, such that the outer sub-shell 22, when the other portions are fused with the sole portion 22d, defines a one-piece tridimensional boot shape. In a particular embodiment, the outer sub-shell 22 forms at least part of the outer surface of the skate boot 12, and accordingly decorative features may be integrated therewith and/or added thereto using any suitable connection method.

The inner sub-shell 24 is received within the outer sub-shell 22, and connected thereto. In the embodiment shown, the inner sub-shell 24 is directly connected to the outer sub-shell 22; as discussed above, the inner sub-shell 24 may alternately be connected to the outer sub-shell 22 through a reinforcement sub-shell received therebetween. The outer surface of the inner sub-shell 24 is complementary to the inner surface of the outer sub-shell 22. The inner sub-shell 24 thus also includes a heel portion 24a, an ankle portion 24b connected to the heel portion 24a and two opposed side portions 24c extending from the heel and ankle portions 24a, 24b. In the particular embodiment shown, the inner sub-shell 24 also includes a sole portion 24d connected to the heel, ankle and side portions 24a, 24b, 24c, such as to define a tridimensional boot shape. In a particular embodiment, the inner sub-shell 24 is made in one piece. Alternately, it can be made from two or more interconnected pieces.

Still referring to FIGS. 2 and 3a-3b, the reinforcement sub-shell 26 has a shape complementary to that of the other sub-shells 22, 24, and accordingly includes a heel portion 26a, an ankle portion 26b connected to the heel portion 26a and shown here as including an optional tendon guard, and two opposed side portions 26c extending from the heel and ankle portions 26a, 26b. In the embodiment shown, the reinforcement sub-shell 26 does not include a substantial sole portion. Each of the side portions 26C has a flap that is disposed at a lower end of the side portion 26C. The flaps are spaced apart from each other to define a gap between the flaps such that the reinforcement sub-shell 26 is free of a sole portion. The reinforcement sub-shell 26 is made of a material sufficiently rigid to maintain its tridimensional shape, and different from the materials of the outer and inner sub-shells 22, 24. For example, in a particular embodiment, the reinforcement sub-shell 26 is made of any non-woven or saturated felt generally used in shoemaking as reinforcements, or a thermoplastic sheet made for example of polyethylene (PE), polypropylene (PP), polystyrene, polyvinyl chloride (PVC), acrylic, nylon, etc.

Still referring to FIGS. 2 and 3a-3b, the reinforcement sub-shell 26 has a shape complementary to that of the other sub-shells 22, 24, and accordingly includes a heel portion 26a, an ankle portion 26b connected to the heel portion 26a and shown here as including an optional tendon guard, and two opposed side portions 26c extending from the heel and ankle portions 26a, 26b. In the embodiment shown, the reinforcement sub-shell 26 does not include a substantial sole portion. The reinforcement sub-shell 26 is made of a material sufficiently rigid to maintain its tridimensional shape, and different from the materials of the outer and inner sub-shells 22, 24. For example, in a particular embodiment, the reinforcement sub-shell 26 is made of any non-woven or saturated felt generally used in shoemaking as reinforcements, or a thermoplastic sheet made for example of polyethylene (PE), polypropylene (PP), polystyrene, polyvinyl chloride (PVC), acrylic, nylon, etc.

In the embodiment shown and with reference to FIGS. 3a-3b, the tridimensional shape of the ankle portions 22b, 24b, 26b adjacent the side portions 22c, 24c, 26c of the sub-shells 22, 24, 26 defines recesses 38 on both sides of the shell 16 adjacent the connection with the heel portions, and bulges 40 on both sides of the shell 16, extending upwardly from the recesses 38, such as to accommodate the shape of an ankle. In a particular embodiment, the recesses 38 and bulges 40 are asymmetrical to better accommodate the natural shape of the ankle.

Referring back to FIG. 1, in a particular embodiment the skate boot includes a sole insert 20 embedded in or received in the skate boot shell 16. The holder 15 is connected to the sole insert 20 by one or more fastener(s) 13 which extend through at least part of the thickness of the sole portion 16d of the skate boot shell 16, such as to form the connection between the holder 15 and the skate boot shell 16. It is understood that the term "fastener" is intended to include any appropriate type of mechanical fastening member including, but not limited to, screws, rivets, nails, clips, staples, and any type of custom-made hardware or mechanical attachment. In a particular embodiment, the fasteners 13 are rivets. In a particular embodiment, the holder 15 is connected to the skate boot shell 16 only by the fastener(s) 13 engaged to the sole insert 20.

In a particular embodiment, the sole insert 20 is made of plastic; non-limiting examples include polypropylene (PP), polyethylene (PE), polyurethane (PU), polyvinyl chloride (PVC), nylon. The holder 15 is connected to the boot shell 16 by the fasteners 13 extending through at least part of the thickness of the sole portion 16d of the skate boot shell 16 and connected to the sole insert 20, and accordingly the sole insert 20 may provide increased structural strength for the boot shell 16 at the connection.

In the embodiment shown in FIG. 3a, the sole insert 20 is received over an inner surface of the skate boot shell 16, corresponding to an inner surface of the sole portion 24d of the inner sub-shell 24. Although the reinforcement sub-shell 26 is shown as abutting the sole insert 20, alternately portions of the reinforcement sub-shell 26 may extend under the sole insert 20, or over the sole insert 20. Alternately, the sole insert 20 may be received between the inner sub-shell 24 and the outer sub-shell 22.

In the embodiment shown in FIG. 3b, the sole insert 20 is embedded in the sole portion 24d of the inner sub-shell 24. The insert 20 may be made of a material more rigid than the material of the inner sub-shell 24. Alternately, the insert 20 may be made of the same material as the inner sub-shell 24, of a material having a similar or same rigidity than the material of the inner sub-shell 24, or of a material less rigid than the material of the inner sub-shell 24. The sole insert 20 may be integrated with the sole portion 24d of the inner sub-shell 24 during its manufacture.

FIG. 4 shows the sole insert 20 in accordance with a particular embodiment. The sole insert 20 includes a sole-shaped body, for example shaped as an insole reinforcement, including a solid perimeter 21 and a plurality of ribs 23 extending across the perimeter 21. The perimeter 21 and ribs 23 frame zones of adjacent openings which are defined by the material of the sole insert 20 being configured in a mesh-like pattern, such as to form for example aligned honeycomb-shaped openings as shown; other configurations are also possible. A plurality of pods 36 are defined on the bottom surface of the perimeter 21 and/or ribs 23. Each pod 36 is shaped and disposed such as to receive one of the fasteners 13 (FIG. 1) connected to the holder 15. The pods 36 may include holes defined therethrough for receiving the fasteners 13, or may be solid such as to be pierced by the fasteners 13 when the holder 15 is connected thereto through the sole portion of the skate boot shell 16.

In a particular embodiment, the sole insert 20 also includes a deformable connection member 37 extending from its bottom surface, for connection with the toe cap 18, 118, as shown in FIG. 16 and as further detailed below.

The body of the sole insert 20 also includes a central opening 27 bordered by a top or inner perimeter surface 29, which in use faces away from the inner surface of the skate boot shell 16—in other words, the inner perimeter surface 29 faces toward the foot of the wearer in use. The sole insert 20 includes a connector 31 received over the perimeter surface 29, and engaged thereto. In a particular embodiment, the connector 31 is connected to the sole portion 16d of the skate boot shell 16 independently of the holder 15 by at least one additional fastener 33. In a particular embodiment, and as can also be seen in FIG. 16, two screws or rivets 33 attach the connector 31 to the sole portion 16*d* of the skate boot shell 16, thereby retaining the sole insert 20 in the skate boot shell 16 until the holder 15 is engaged thereto. The connector 31 may also be connected to the holder 15 through the skate boot shell 16, for example by a fastener received through a central hole 35 of the connector 31.

In a particular embodiment, the connector 31 ensures the proper position of the sole insert 20 within the skate boot shell 16, such as to align the pods 36 with the position of the fastener-receiving holes of the holder 15. One or more of the sub-shells may be fabricated with holes to receive the additional fasteners 33 engaging the connector 31; in a particular embodiment, the inner sub-shell 24 is molded with these holes being defined therein, such as to ensure a constant position for the holes skate boot shells 16 having the same size. Engagement of the connector 31 with these predefined holes thus ensures a constant position of the connector 31, and of the sole insert 20, for similar skates.

In a particular embodiment, the same body for the sole insert 20 may be used for two or more different boot sizes, for example for two sizes of skate boot 12 differing by a half size, by changing the position of the sole insert 20 along the length of the skate boot shell 16. In a particular embodiment, the two boot sizes differing by a half size (e.g. 4 mm difference in overall length) are obtained with the same boot shell 16, the same holder 15, and different sized toe caps 18. The position of the holder 15 is determined with respect to the overall length of the skate boot (e.g. centered with respect thereto) and accordingly, the position of the holder 15 with respect to the boot shell 16 is different between the two half sizes. Two different connectors 31 are thus used for the two half sizes, the two connectors having different positions of the holes for receiving the additional fasteners 33 engaging the connector to the boot shell 16. Each connector 31 thus position the same body of the sole insert 20 within the boot shell 16 in a respective position corresponding to the overall skate boot size, in correspondence with the position of the holder 15 for that size. Alternately, a single connector may be defined with holes positioned such as to be suitable to receive the fasteners 33 for one of the half sizes in one orientation of the connector and for the other of the half sizes in another orientation, for example with the two orientations being offset by 180 degrees with respect to one another. Other configurations are also possible.

In another embodiment, the sole insert 20 is provided as a monolithic element. Such a configuration may be particularly, although not exclusively, be suited for embodiments where the sole insert 20 is embedded in the inner sub-shell 24, such as shown in FIG. 3*b*. The same monolithic sole inserts can also be used in different skate boot sizes, for example for two sizes of skate boot 12 differing by a half size, through different positions within the skate boot shell as discussed above.

Referring to FIG. 5, an alternate configuration for the sole insert 120 is shown, including a front U-shaped portion 130 and a rear U-shaped portion 132 oriented with the open end of the "U" facing away from one another, and which are interconnected by a member 134. The portions 130, 132 each include a plurality of pods 136 for receiving the fasteners 13. Such a configuration may be particularly, although not exclusively, be suited for embodiments where the sole insert 120 is embedded in the inner sub-shell 24, such as shown in FIG. 3*b*.

It is understood that the particular sole insert configurations shown are provided for illustrative purposes only, and that the configuration of the sole insert may vary. For example, the sole insert 20, 120 may be provided in two or more sections which may be unconnected to one another.

As will be detailed further below, each of the sub-shells 22, 24, 26 is shaped to its tridimensional shape prior to being interconnected to one another, although the sub-shells 22, 24, 26 may be shaped together. In some embodiments, the sub-shells 22, 24, 26 are shaped separately, and inserted in one another before being interconnected.

In a particular embodiment, and referring to FIG. 6, the outer sub-shell 22 is first formed from one or more layers of the outer sub-shell material(s) disposed in a flat configuration. The outer sub-shell materials include at least a base material in a formable state, i.e. a state in which it is or is able to become flexible to be manipulated to obtain a different form, after which it is able to become rigid (whether reversibly or permanently) to retain this different form. The outer sub-shell materials may also include flexible materials (e.g. reinforcement fibers) which are retained in the final form by the base material once rigid. In a particular embodiment, the formable material is thermoplastic, and accordingly is flexible or becomes flexible under heat to be manipulated to obtain a different form, and becomes rigid once cooled down to retain this form. Advantageously, in a particular embodiment, the use of thermoplastic material may allow the user to reheat the skate boot to change its shape to conform more closely to a particular foot configuration. Alternately, the formable material may be a thermoset material in a partially uncured state (e.g. prepreg), flexible and able to be manipulated to obtain a different form, and becoming rigid once cured to retain this form.

In the embodiment shown, a base layer 50 made of thermoformable resin is provided, and additional smaller reinforcement pieces 52 including for example carbon fibers are provided on the base layer 50 (shown here in the tendon area of the ankle portion 22*b*, in the side portions 22*c*, and on the heel portion 22*a* on opposite sides of the foot) to provide reinforcement). The layers 50, 52 may include indentations and/or slots 54 to facilitate folding into the desired tridimensional shape. The layers 50, 52 may be pressed in the flat configuration, for example under heat, to connect the different layers 50, 52 together, as long as the pressed material remains formable to be able to be formed or bent to conform to the desired tridimensional shape of the outer sub-shell 22. In the embodiment shown, the layers 50, 52 defines the heel, ankle and side portions 22*a*, 22*b*, 22*c*, as well as part of the sole portion 22*d*. It is understood that the particular configuration shown for the layer(s) 50, 52 is provided as an example only and that variations are possible.

Figure 8:
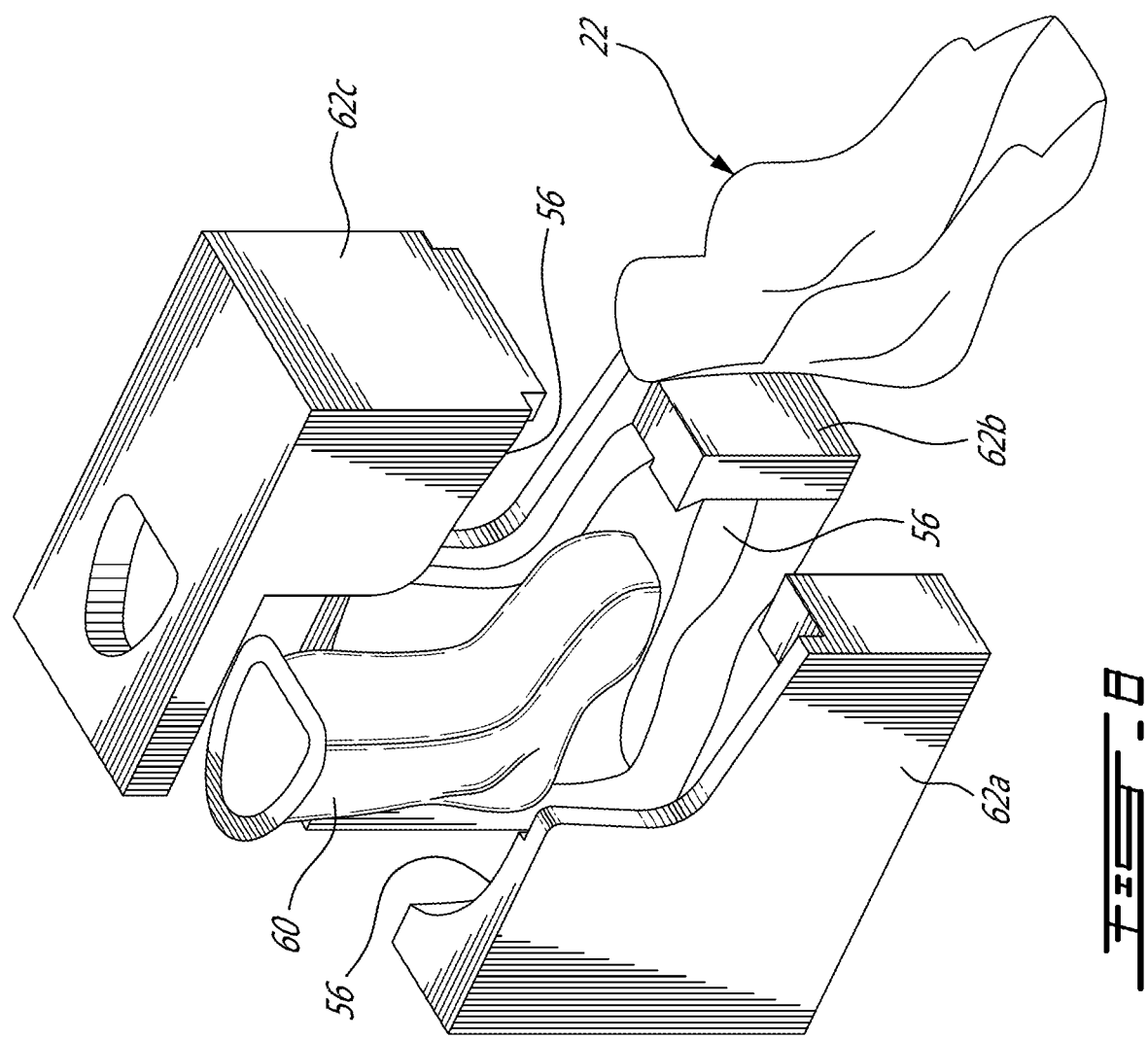
FIG. 8 is a schematic tridimensional exploded view illustrating the shaping of the outer sub-shell of FIG. 7.

Referring to FIG. 7, the layer(s) 50, 52 are then formed or bent to conform to a mold surface 56 complementary to the heel, ankle, side and sole portions 22*a*, 22*b*, 22*c*, 22*d*. In a particular embodiment, the thermoformable layer(s) 50, 52 are heated to help them conform more easily to the mold surface 56. In the embodiment shown, the mold is a female mold, although alternately a male mold surface may be used. A formable sole element 58 (for example made of the same material as the base layer 50) is placed over the formed layers 50, 52, in contact with the first heel, ankle and side portions 22*a*, 22*b*, 22*c* and over the part of the sole portion 22*d* defined by the layers 50, 52; in the embodiment shown the sole element 58 is placed inside the boot shape formed by the formed layers 50, 52, but alternately it may be placed against the base layer 50 outside the boot shape. Referring to FIG. 8, the material is then heated and pressed against the mold surface 56, shown here as formed by three complementary mold portions 62a, 62b, 62c, using for example an inflatable bladder 60. In a particular embodiment, the final thickness of the outer sub-shell 22 is controlled through controlling of the temperature at which the thermoformable layer(s) 50, 52 are heated during this forming process, by increasing the temperature when the thickness needs to be lower, and reducing the temperature when the thickness needs to be greater. The material is forced into the desired boot shape (and cured if it was in a partially uncured state) and the sole element 58 is fused with the remainder of the outer sub-shell 22. Once the sub-shell 22 is cooled, it is sufficiently rigid to retain its tridimensional shape.

Figure 9:
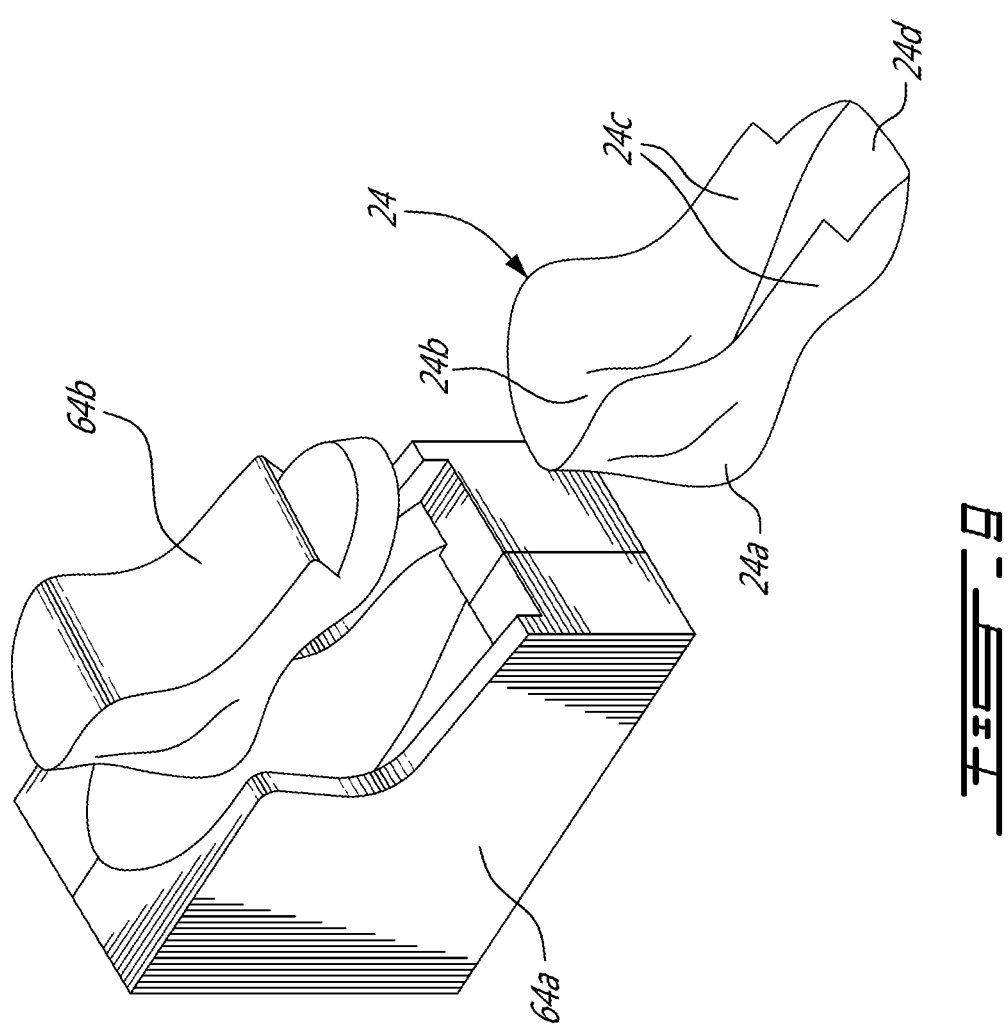
FIG. 9 is a schematic tridimensional exploded view illustrating the shaping of an inner sub-shell in accordance with a particular embodiment, which may be used in skate boot shell such as shown in FIG. 2.

In a particular embodiment, and referring to FIG. 9, the inner sub-shell 24 is shaped by injection molding in a mold cavity formed between complementary female and male mold portions 64a, 64b which are shaped to define the heel, ankle, side and sole portions 24a, 24b, 24c, 24d. In an embodiment where the sole insert 20, 120 is integrated into the inner sub-shell 24 such as shown in FIG. 3b, the sole insert 20, 120 is placed within the mold cavity prior to injecting the material of the inner sub-shell 24, such as to be integrated therewith.

Figure 10:
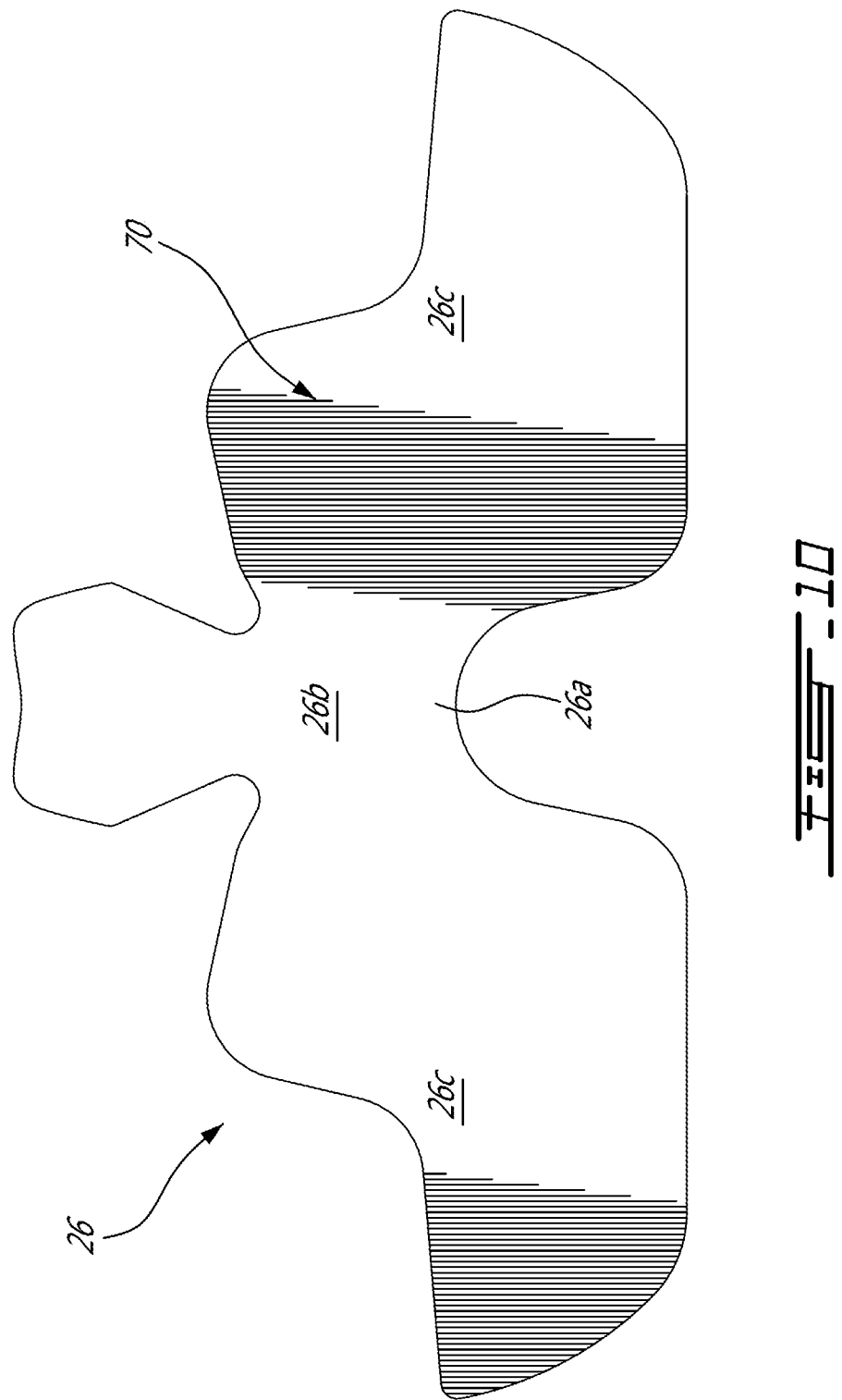
FIG. 10 is a schematic plan view of a flat material form to be shaped to define a reinforcement sub-shell in accordance with a particular embodiment, which may be used in a skate boot shell such as shown in FIG. 2.

In a particular embodiment, and referring to FIG. 10, the reinforcement sub-shell 26 is first formed from one or more layers 70 of the reinforcement material in a flat configuration and in a formable state, for example made of thermoplastic material. In the embodiment shown, a single layer 70 is provided. Alternately, multiple layers 70 may be provided; the layers may be made of the same material, or two or more of the layers maybe made of or include different materials from one another. Although not shown, the layer(s) 70 may include indentations and/or slots to facilitate folding into the desired tridimensional shape. The layer(s) 70 may also be formed of multiple pieces. In the embodiment shown, the layer(s) 70 define the heel, ankle and side portions 26a, 26b, 26c.

Figure 11:
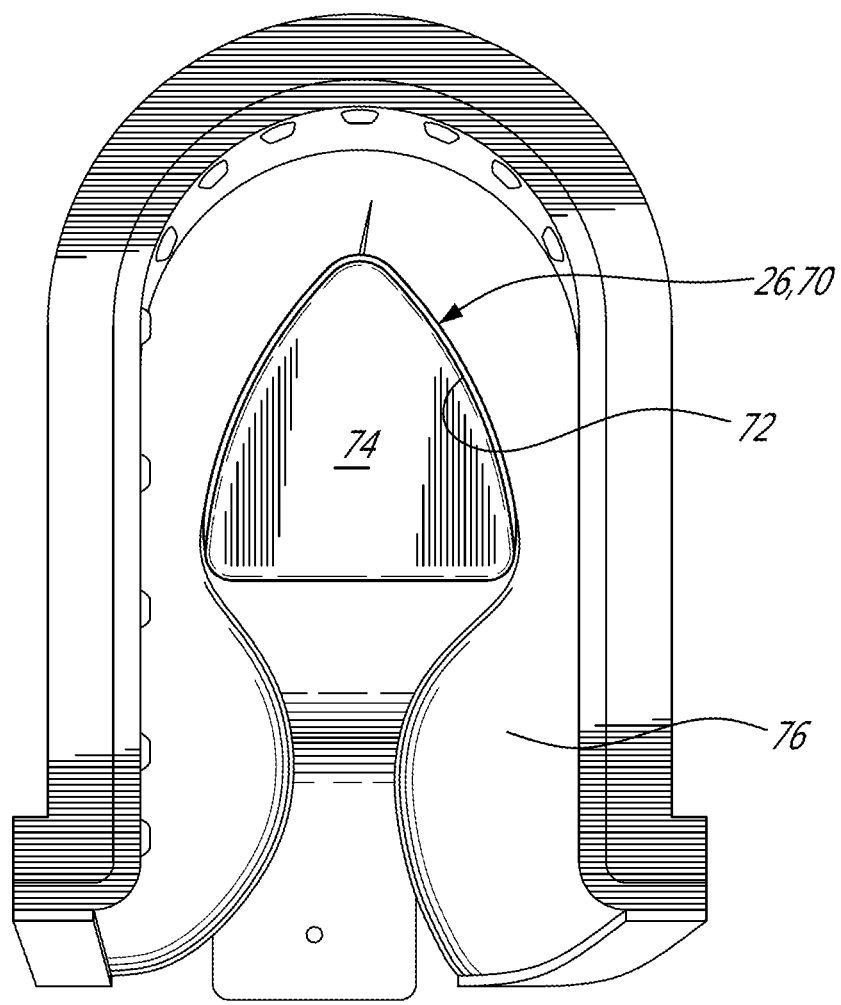
FIG. 11 is a schematic tridimensional view of a reinforcement sub-shell being shaped in a mold in accordance with a particular embodiment.

Referring to FIG. 11, the layer(s) 70 are heated and then formed or bent to conform to a mold surface 72 complementary to the heel, ankle and side portions 26a, 26b, 26c; alternately, the layer(s) 70 may be heated during engagement with the mold surface 72. In the embodiment shown, the mold is a male mold defined by a tridimensional boot shape 74, although alternately a female mold surface may be used. The material is pressed against the mold surface 72, for example using an inflatable bladder 76. Once the reinforcement sub-shell 26 is cooled, it is sufficiently rigid to retain its tridimensional shape.

It should be noted that the particular methods of manufacture shown and described for the sub-shells 22, 24, 26 are provided as an example only, and that alternate methods are also considered.

For example, the inner sub-shell 24 may be formed from one or more layers of the inner sub-shell material in a flat configuration and in a flexible state, for example at least partially uncured, and then by forming or bending and pressing the heated layer(s) against a female mold surface 56, such as shown for example in FIG. 8, or against a male mold surface 72, such as shown for example in FIG. 11, after which the inner sub-shell 24 is cooled and retains its tridimensional shape. It is understood that each method described for each of the sub-shells 22, 24, 26 can be applied to the other sub-shells 22, 24, 26.

In another embodiment, the inner sub-shell 24 is manufactured by loading randomly arranged particles of an expanded material into a mold through a stream of a transport material, which may be liquid and/or steam, or powder that behaves like a liquid; in a particular embodiment, the transport material is water. The particles may be loaded into the mold under pressure to compress the particles in order to achieve a higher material density. The transport material may be at least partially or entirely removed from the mold after the introduction of the expanded material, or may remain in part or in whole to form part of the cured material. By means of pressure and/or heat and/or steam treatment, the particles of the expanded material combine by slightly melting their surfaces and/or undergo chemical bonding to form the inner sub-shell having the desired tridimensional shape. Additional details on this method of manufacture are provided in co-pending application Ser. No. 14/178,581 filed on Feb. 12, 2014, which is incorporated herein by reference in its entirety.

In another embodiment, the sub-shells 22, 24 (and optionally 26), are shaped together prior to being bonded. A flat member including at least one layer of the material of each of the outer and inner sub-shells 22, 24 (and, when provided, of the reinforcement sub-shell 26) is formed, for example having a configuration similar to that shown in FIG. 6. The layers are heated, prior and/or while being formed or bent to conform to a mold surface, for example by pressing the heated layers against a female mold surface 56, such as shown for example in FIG. 8, or against a male mold surface 72, such as shown for example in FIG. 11. The temperature of the layers is selected such as to avoid binding the layers together, thus allowing relative movement between the different materials as they are being formed or bent. Once the sub-shells 22, 24 (and optionally 26) have the desired tridimensional shape, they are then interconnected. Alternately, the sub-shells 22, 24 (and optionally 26) may be laminated as flat members, and the laminated flat members are heated, prior and/or while being formed or bent to conform to a mold surface, for example by pressing the heated layers against a female mold surface 56, such as shown for example in FIG. 8, or against a male mold surface 72, such as shown for example in FIG. 11, such as to form the bonded tridimensional sub-shells 22, 24 (and optionally 26).

In a particular embodiment, the sub-shells 22, 24 (and optionally 26), once shaped, are bonded together through lamination, with the inner sub-shell 24 received in the outer sub-shell 22 and with the outer surface of the inner sub-shell 24 in alignment with the inner surface of the outer sub-shell 22. The lamination is performed by applying pressure on one of the sub-shells 22, 24 toward the other, against a mold surface.

Referring to FIG. 12a, in a particular embodiment, the assembled sub-shells 22, 24 (and optionally 26) forming the boot shell 16 are receiving within a female mold 80 defining a mold surface 82 complementary to an outer surface of the outer sub-shell 22, and pressure is applied against the mold surface 82 using an inflatable bladder 84 received within the inner sub-shell 24 (and, when present, within the reinforcement sub-shell 26).

Figure 12B:
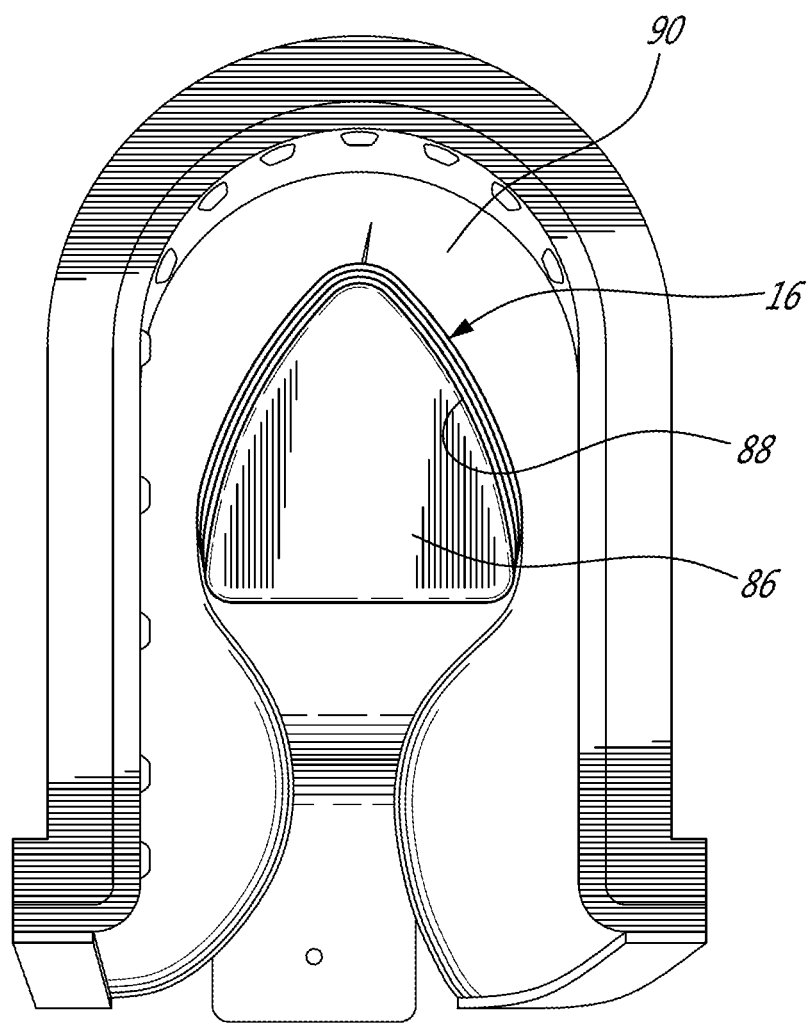
FIG. 12b is a schematic tridimensional view illustrating the lamination of the components of a skate boot shell such as shown in FIG. 2, in accordance with another particular embodiment.

Referring to FIG. 12b, in another embodiment, a tridimensional boot shape 86 defining a male mold surface 88 complementary to an inner surface of the assembled sub-shells 22, 24 (and optionally 26) forming the boot shell 16 is received within the shell 16, and pressure is applied against the mold surface 88 using an inflatable bladder 90 surrounding the assembled shell 16.

In a particular embodiment, the assembled sub-shells 22, 24 (and optionally 26) are heated prior to being received against the mold surface. In addition or alternately, the assembled sub-shells 22, 24 (and optionally 26) may be heated when received against the mold surface.

In a particular embodiment, the sub-shells 22, 24 (and optionally 26) are interconnected using adhesive prior to being heated and pressed against the mold surface.

In embodiments where the inner sub-shell 24 is not formed with a sole portion 24*d*, the lamination process may include inserting a sole portion within the inner sub-shell 24 prior to interconnecting the sub-shells 22, 24 (and optionally 26), the sole portion being connected to the sub-shells during interconnection of the sub-shells.

Figure 13A:
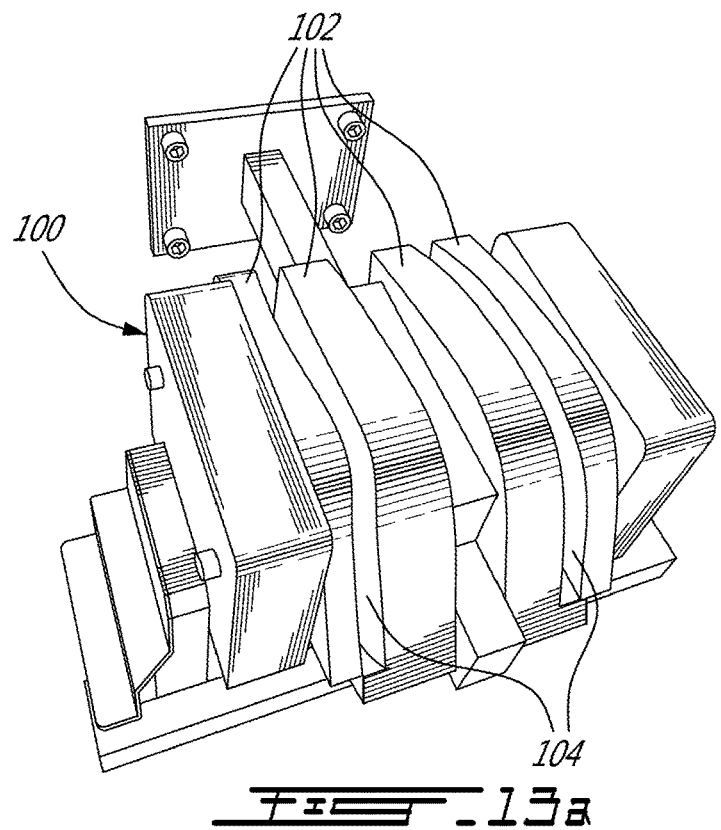
FIG. 13a is a schematic tridimensional view of a re-shaping press which may be used to reshape the boot shell in accordance with a particular embodiment.
Figure 13B:
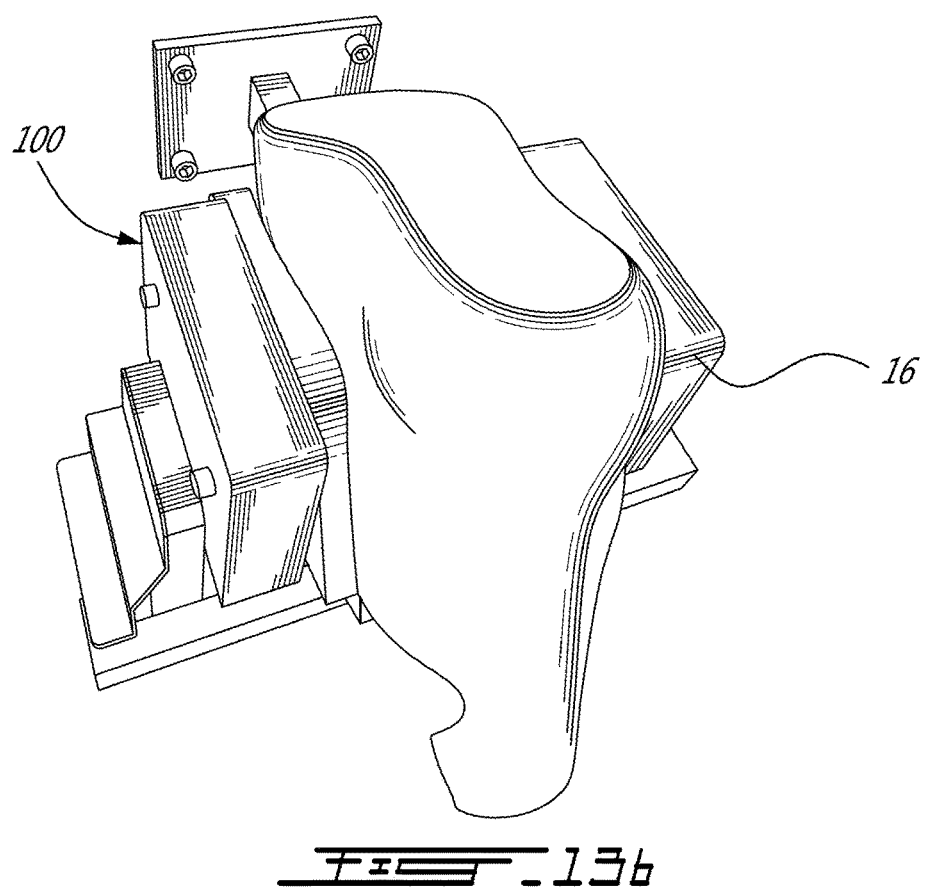

In a particular embodiment where the sub-shells are made of thermoplastic material, the assembled and laminated boot shell 16 may be re-shaped after the lamination process, for example to create an embossed feature, to change the geometry in a specific area, to add a feature facilitating connection with other pieces of the skate boot, etc. The shell 16 is heated prior to and/or during being pressed against a mold surface complementary to the feature(s) to be added to the shape of the shell 16. Referring to FIG. 13*a*, a press 100 in accordance with a particular embodiment is shown. The press includes dies 102 each defining a mold surface complementary to the feature(s) to be shaped in the boot shell 16. In a particular embodiment, the dies 102 are interchangeable, such as to be able to create different features with the press. The dies 102 define mold surfaces facing one another between which a slot 104 is defined, in which the walls of the shell 16 are received. FIG. 13*b* shows the boot shell 16 engaged with the dies 102. The boot shell 16 may be heated before and/or during being pressed. The dies 102 sandwich the walls of the shell 16 and apply pressure against one another on both sides each wall to conform the walls to the shape of the dies 102, thus creating the new geometry. Once cooled, the boot shell 16 retains this new geometry.

Figure 14:
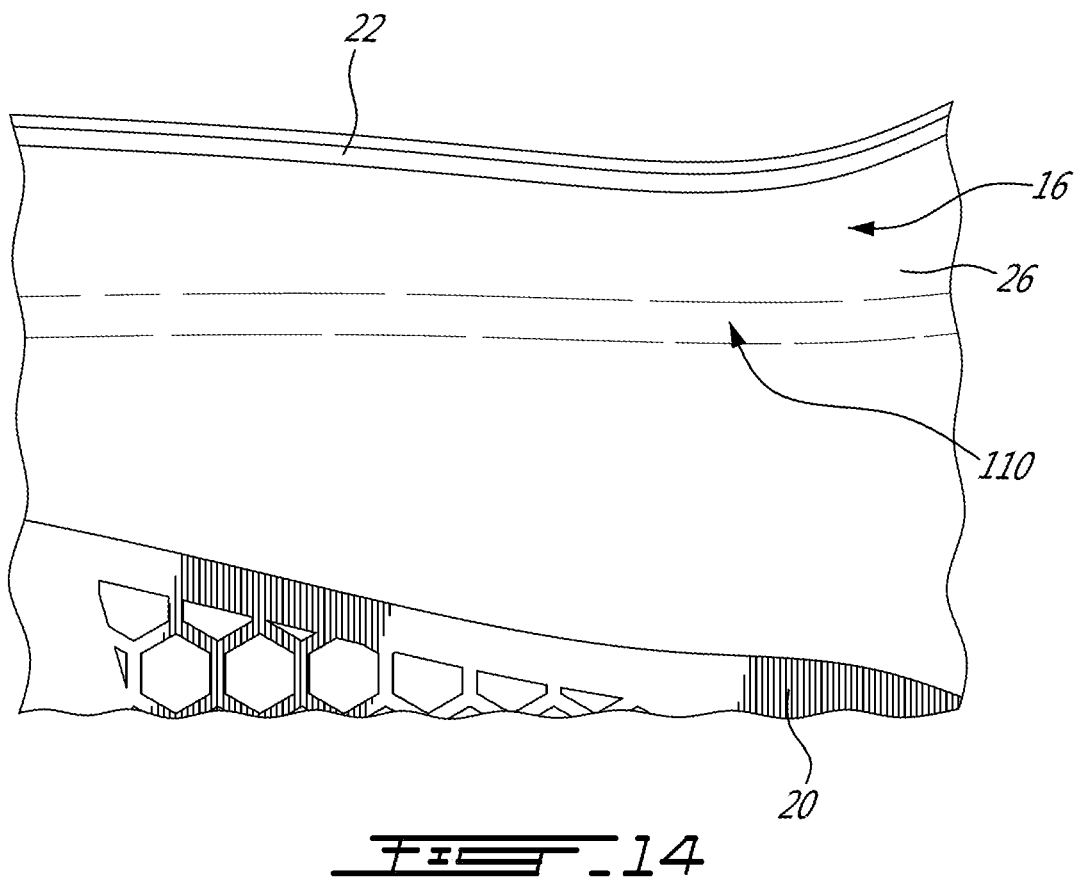
FIG. 14 shows a portion of a reshaped boot shell, in accordance with a particular embodiment.

Referring to FIG. 14, in a particular embodiment, the boot shell 16 is reshaped to add an indent or step 110 along the upper edges of the laminated shell 16. It is understood that features of any other appropriate type and/or location may be created, and that the shell 16 may be pressed against mold surface(s) using any other appropriate method, including but not limited to the methods discussed above.

Figure 15A:
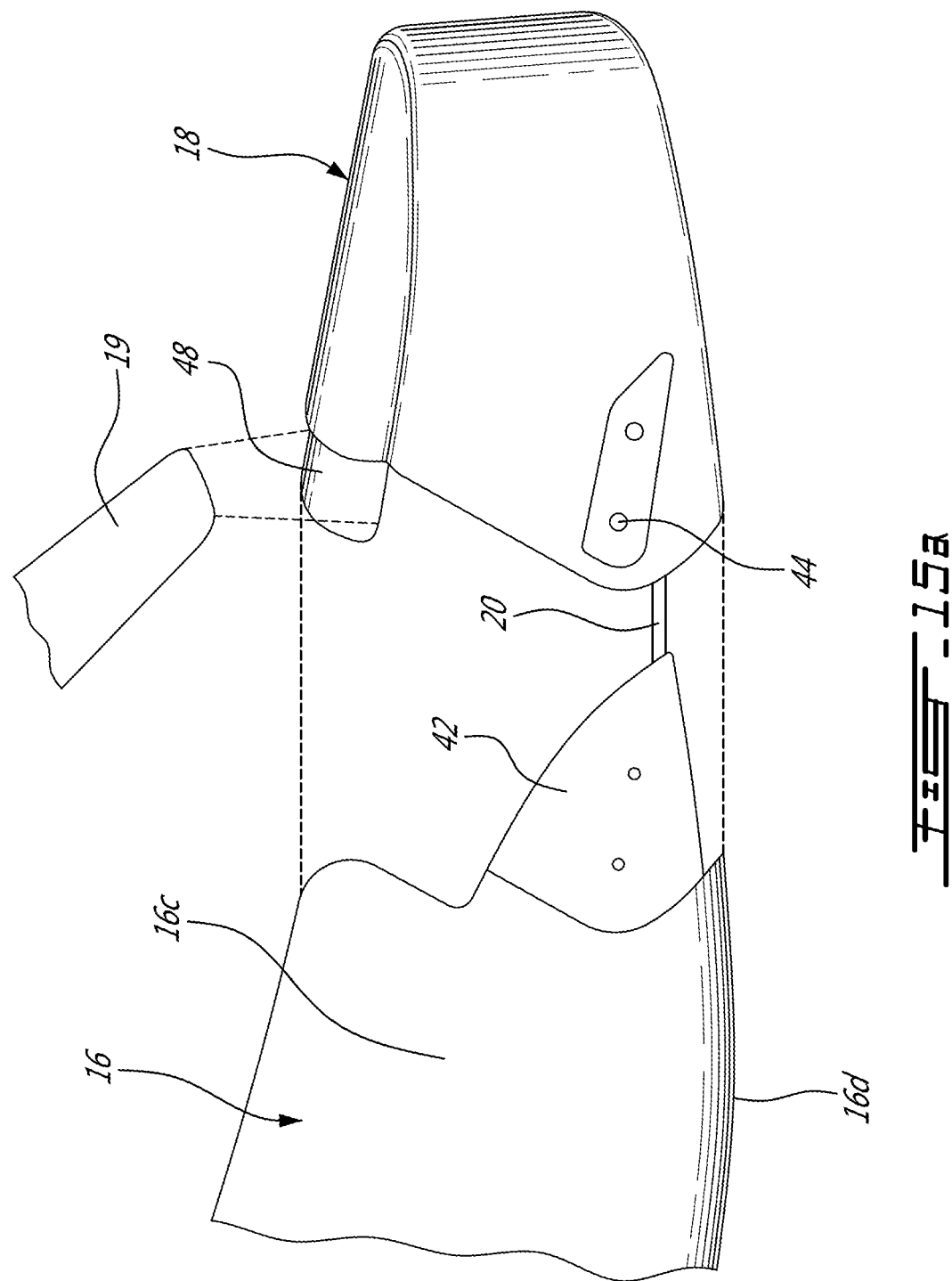
FIG. 15a is a schematic side view of a toe cap and a front portion of a skate boot shell, in accordance with a particular embodiment.

Referring to FIG. 15*a*, once the skate boot shell 16 is formed, the toe cap 18 is engaged to front ends of the opposed side portions 16*c* and of the sole portion 16*d*, and connected to the skate boot shell 16. In the embodiment shown, the front ends of the side portions 16*c* and of the sole portion 16*d* form a recessed portion 42 inwardly recessed with respect to the outer surfaces of the side portions 16*c* and of the sole portion 16*d*, and this recessed portion 42 is received inside the toe cap 18. In the particular embodiment shown, the rear edges of the toe cap 18 abut the shoulder formed by the transition between the recessed portion 42 and the adjacent outer surface of the un-recessed part of the side portions 16*c* and of the sole portion 16*d*, and the outer surfaces of the toe cap 18 are in alignment with the outer surfaces of the side portions 16*c* and of the sole portion 16*d* such as to define an even outer surface at the transition between the shell 16 and toe cap 18. The recessed portion 42 may be in contact with inner surfaces of the toe cap 18, for example to define an interference fit. The toe cap 18 is connected to the front ends of the opposed side portions 16*c* by fasteners 44 extending through the wall of the toe cap 18 and through the recessed portion 42. In a particular embodiment, the fasteners 44 are rivets. Other types of fasteners can alternately be used.

The configuration of the toe cap 18 and recessed portion 42 are particularly, although not exclusively, suitable for assembly with a boot shell 16 formed from one or more tridimensional sub-shells as discussed herein, as the toe cap 18 can be attached to the boot shell through methods other than sewing (including, but not limited to, fasteners as discussed and/or adhesive), since in at least some embodiments the tridimensional configuration of the boot shell 16 can make it difficult and/or impractical to use a conventional sewing method to attach a toe cap to the boot shell 16.

The toe cap 18 further includes a tongue tab 48 extending rearwardly from a top surface of the toe cap 18, for engagement with a tongue 19 of the skate boot 12. In a particular embodiment, the end of the tongue 19 is stitched to the tongue tab 48. Other types of connections and configurations are also possible.

In a particular embodiment, the sole insert 20 extends forwardly out of the skate boot shell 16 and is received within the toe cap 18. As can be seen in FIG. 16, the front end of the sole insert 20 is connected to the toe cap 18 by the deformable connection member 37 being received in a complementary hole 46 defined through a bottom surface of the toe cap 18. In the embodiment shown, the connection member 37 includes four legs 39 each having a radially outwardly extending flange 41, such that the outer diameter defined by the flanges 41 is greater than the diameter of the hole 46. The legs 39 are plastically deformable to bring them closer to one another such as to be able to insert the legs 39 through the hole 46 until the flanges 41 are out of the hole 46 and the legs 39 regain their original position. The flanges 41 abut the perimeter of the hole 46 and prevent the sole insert 20 from being disengaged from the toe cap 18 unless the legs 39 are again plastically deformed. Other configurations are also possible.

In a particular embodiment, the sole insert 20, 120 received inside and connected to the toe cap 18 provides for increased stability and/or foot support, allowing the toe cap to react to the movements of the foot together with the sole insert 20, 120 on or over which the foot is supported.

Referring to FIG. 15*b*, in another embodiment, the toe cap 118 has opposed side wall portions 118*a* extending rearwardly, inwardly recessed from a remainder of the toe cap's outer surface. These wall portions 118*a* are sized to be engaged inside the boot shell 16 against its inner surface and retained through an interference fit. Fasteners, for example rivets, may interconnect the wall portions 118*a* and the boot shell 16.

In a particular embodiment, different toe caps 18, 118 having different sizes can be engaged to the same boot shell 16, for example two toe caps sized to define different half-sizes for the boot 12. The same boot shell 16 may thus be used for two sizes of skate boot 12 differing by a half size, by selecting the appropriate toe cap 18, 118 to be engaged therewith.

The above description is meant to be exemplary only, and one skilled in the art will recognize that changes may be made to the embodiments described without departing from the scope of the invention disclosed. For example, the sole insert 20, 120 and/or toe cap 18, 118 may be used with a skate boot shell formed as a single shell, as opposed to formed by a plurality of interconnected sub-shells as described and shown; the skate boot shell formed by the plurality of interconnected sub-shells may be provided without the sole insert 20, 120 and/or without the toe cap 18, 118 or with a differently configured toe cap/toe portion. Other modifications other than those discussed which fall within the scope of the present invention will be apparent to those skilled in the art, in light of a review of this disclosure, and such modifications are intended to fall within the appended claims.

The invention claimed is:

1. A skate comprising:
a skate boot having a shell with a first side and a second side, the shell including:
a tridimensional outer sub-shell made of a first material, the outer sub-shell including a first heel portion, a first ankle portion connected to the first heel portion, two opposed first side portions located on the first side and the second side, respectively, and extending from the first heel and ankle portions, and a first sole portion connected to the first heel, ankle and side portions,
a tridimensional inner sub-shell received within and connected to the outer sub-shell, an outer surface of the inner sub-shell being complementary to an inner surface of the outer sub-shell, the inner sub-shell being made of a second material different from the first material, the inner sub-shell including a second heel portion, a second ankle portion connected to the second heel portion, and two opposed second side portions located on the first side and the second side, respectively, and extending from the second heel and ankle portions, and
a tridimensional reinforcement sub-shell made of a third material different from the first and second materials and bonded inside the inner sub-shell, the reinforcement sub-shell including a third heel portion, a third ankle portion connected to the third heel portion, and two opposed third side portions located on the first side and the second side, respectively, and extending from the third heel and ankle portions,
each of the first, second and third side portions on the first side of the shell having a first recess adjacent the first, second and third heel portions and a first bulge extending upwardly from the first recess;
each of the first, second and third side portions on the second side of the shell having a second recess adjacent the first, second and third heel portions and a second bulge extending upwardly from the second recess;
the first recesses and the first bulges defining a first shape, and the second recesses and the second bulges defining a second shape, the first and second shapes being asymmetrical; and
a ground-engaging assembly received along a bottom surface of the first sole portion and engaged to the skate boot.

2. The skate as defined in claim 1, wherein the inner sub-shell is monolithic.

3. The skate as defined in claim 1, wherein the inner sub-shell includes a second sole portion connected to the second heel, ankle and side portions.

4. The skate as defined in claim 1, wherein the inner sub-shell is connected to the outer sub-shell through direct engagement of the outer surface of the inner sub-shell with the inner surface of the outer sub-shell, the reinforcement sub-shell being received within and connected to the inner sub-shell, an outer surface of the reinforcement sub-shell being complementary to an inner surface of the inner sub-shell.

5. The skate as defined in claim 1, wherein the second material is a foam.

6. The skate as defined in claim 1, wherein the first material is more rigid than the second material.

7. The skate as defined in claim 1, wherein the first material is a thermoplastic material.

8. The skate as defined in claim 1, wherein the outer, inner, and reinforcement sub-shells are interconnected by lamination.

9. The skate as defined in claim 1, wherein the outer, inner, and reinforcement sub-shells are interconnected by a combination of lamination and adhesive.

10. The skate as defined in claim 1, wherein each of the third side portions has a flap extending along a length of the shell and disposed at a lower end and spaced apart from each other to define a gap between the flaps such that the reinforcement sub-shell is free of a sole portion, each of the flaps having grooves extending inwardly into the flap toward the third side portion, the grooves spaced apart from each other in a direction along a length of the shell.

11. A skate boot shell comprising:
a first side and a second side;
a tridimensional outer sub-shell made of a first material, the outer sub-shell including a first heel portion, a first ankle portion connected to the first heel portion, two opposed first side portions located on the first side and the second side, respectively, and extending from the first heel and ankle portions, and a first sole portion connected to the first heel, ankle and side portions;
a tridimensional inner sub-shell received within and connected to the outer sub-shell, an outer surface of the inner sub-shell being complementary to at least part of an inner surface of the outer sub-shell, the inner sub-shell being made of a second material different from the first material, the inner sub-shell including a second heel portion, a second ankle portion connected to the second heel portion, and two opposed second side portions located on the first side and the second side, respectively, and extending from the second heel and ankle portions; and
a tridimensional reinforcement sub-shell made of a third material different from the first and second materials and bonded inside the inner and sub-shell, the reinforcement sub-shell including a third heel portion, a third ankle portion connected to the third heel portion, and two opposed third side portions located on the first side and the second side, respectively, and extending from the third heel and ankle portions;
each of the sub-shells on the first side of the shell having a first recess adjacent the first heel portion and a first bulge extending upwardly from the first recess;
each of the sub-shells on the second side of the shell having a second recess adjacent the first heel portion and a second bulge extending upwardly from the second recess; and
the first recesses and the first bulges defining a first shape, and the second recesses and the second bulges defining a second shape, the first and second shapes being asymmetrical.

12. The skate boot shell as defined in claim 11, wherein the inner sub-shell is monolithic.

13. The skate boot shell as defined in claim 11, wherein the inner sub-shell includes a second sole portion connected to the second heel, ankle and side portions.

14. The skate boot shell as defined in claim 11, wherein the inner sub-shell is connected to the outer sub-shell through direct engagement of the outer surface of the inner sub-shell with the inner surface of the outer sub-shell, the reinforcement sub-shell being received within and connected to the inner sub-shell, an outer surface of the reinforcement sub-shell being complementary to an inner surface of the inner sub-shell.

15. The skate boot shell as defined in claim 11, wherein the second material is a foam.

16. The skate boot shell as defined in claim 11, wherein the first material is more rigid than the second material.

17. The skate boot shell as defined in claim 11, wherein the first material is a thermoplastic material.

18. The skate boot shell as defined in claim 11, wherein the outer, inner, and reinforcement sub-shells are interconnected by lamination.

19. The skate boot shell as defined in claim 11, wherein the outer, inner, and reinforcement sub-shells are interconnected by a combination of lamination and adhesive.

* * * * *